United States Patent
Ko et al.

(10) Patent No.: US 12,309,100 B2
(45) Date of Patent: May 20, 2025

(54) WIRELESS COMMUNICATION METHOD USING MULTIPLE LINKS, AND WIRELESS COMMUNICATION TERMINAL USING SAME

(71) Applicant: WILUS INSTITUTE OF STANDARDS AND TECHNOLOGY INC., Gyeonggi-do (KR)

(72) Inventors: Geonjung Ko, Gyeonggi-do (KR); Juhyung Son, Gyeonggi-do (KR); Sanghyun Kim, Seoul (KR); Jinsam Kwak, Gyeonggi-do (KR)

(73) Assignee: WILUS INSTITUTE OF STANDARDS AND TECHNOLOGY, Gyeonggi-do (KR)

( * ) Notice: Subject to any disclaimer, the term of this patent is extended or adjusted under 35 U.S.C. 154(b) by 353 days.

(21) Appl. No.: 17/910,465

(22) PCT Filed: Mar. 11, 2021

(86) PCT No.: PCT/KR2021/003057
§ 371 (c)(1),
(2) Date: Sep. 9, 2022

(87) PCT Pub. No.: WO2021/182902
PCT Pub. Date: Sep. 16, 2021

(65) Prior Publication Data
US 2023/0140556 A1    May 4, 2023

(30) Foreign Application Priority Data

Mar. 11, 2020  (KR) ........................ 10-2020-0030442
Aug. 13, 2020  (KR) ........................ 10-2020-0102019
Aug. 26, 2020  (KR) ........................ 10-2020-0108179

(51) Int. Cl.
*H04W 76/15*    (2018.01)
*H04L 5/00*    (2006.01)
(Continued)

(52) U.S. Cl.
CPC .......... *H04L 5/0055* (2013.01); *H04L 5/0053* (2013.01); *H04W 74/085* (2013.01); *H04W 74/0866* (2013.01); *H04W 76/15* (2018.02)

(58) Field of Classification Search
None
See application file for complete search history.

(56) References Cited

U.S. PATENT DOCUMENTS

2017/0280498 A1   9/2017   Min et al.
2018/0084582 A1   3/2018   Liu et al.
(Continued)

FOREIGN PATENT DOCUMENTS

CN    109587052    4/2019
CN    110199494    9/2019
(Continued)

OTHER PUBLICATIONS

Rejection dated Aug. 13, 2024 for Japanese Patent Application No. 2022-554673 and its English translation provided by Applicant's foreign counsel.
(Continued)

*Primary Examiner* — Pamit Kaur
(74) *Attorney, Agent, or Firm* — WOMBLE BOND DICKINSON (US) LLP

(57) ABSTRACT

A multi-link device using a plurality of links is disclosed. The multi-link device comprises: a transceiving unit; and a processor. When the multi-link device transmits a plurality of PPDUs simultaneously on the plurality of links using the transceiving unit, the processor determines a transmission
(Continued)

end time of the plurality of PPDUs on the basis of whether the multi-link device transmits a frame requesting an ACK.

14 Claims, 17 Drawing Sheets

(51) Int. Cl.
  *H04W 74/08* (2009.01)
  *H04W 74/0833* (2024.01)

(56) References Cited

U.S. PATENT DOCUMENTS

| | | | |
|---|---|---|---|
| 2018/0110076 | A1 | 4/2018 | Ko et al. |
| 2019/0058569 | A1 | 2/2019 | Seok |
| 2019/0082373 | A1* | 3/2019 | Patil ................. H04L 1/1614 |
| 2019/0335454 | A1* | 10/2019 | Huang ............... H04W 72/542 |
| 2020/0037288 | A1 | 1/2020 | Huang et al. |
| 2021/0014811 | A1 | 1/2021 | Seok et al. |
| 2021/0195540 | A1* | 6/2021 | Fischer ............. H04W 56/0005 |
| 2021/0251006 | A1 | 8/2021 | Cariou et al. |
| 2021/0298076 | A1* | 9/2021 | Kim .................. H04W 84/12 |
| 2022/0131956 | A1* | 4/2022 | Li .................... H04W 74/0816 |
| 2022/0141785 | A1 | 5/2022 | Gan et al. |
| 2022/0338285 | A1* | 10/2022 | Zhou ................. H04W 76/15 |
| 2022/0417857 | A1* | 12/2022 | Guo .................. H04W 52/028 |

FOREIGN PATENT DOCUMENTS

| | | |
|---|---|---|
| EP | 3 481 129 | 5/2019 |
| KR | 10-2019-0129044 | 11/2019 |
| WO | 2019/004055 | 1/2019 |
| WO | 2020/032633 | 2/2020 |
| WO | 2021/008502 | 1/2021 |

OTHER PUBLICATIONS

Decision to Reject the Amendments dated Aug. 13, 2024 for Japanese Patent Application No. 2022-554673 and its English translation provided by Applicant's foreign counsel.
Notice of Allowance dated Sep. 25, 2024 for Korean Patent Application No. 10-2024-7027241 aand its English translation provided by Applicant's foreign counsel.
International Search Report for PCT/KR2021/003057 mailed on Jul. 6, 2021 and its English translation from WIPO (now published as WO 2021/182902).
Written Opinion of the International Searching Authority for PCT/KR2021/003057 mailed on Jul. 6, 2021 and its English translation by Google Translate (now published as WO 2021/182902).
Taewon Song et al.: "Multi-link Acknowledgement Follow Up", IEEE 802.11-20/0012r0, Jan. 13, 2020, slides 1-14.
Minyoung Park et al.: "Multi-link power save operation", IEEE 802.11-19/1544r2, Jan. 10, 2020, slides 1-16.
Yongho Seok et al.: "Synchronous Multi-Link Operation", IEEE 802.11-19/1305r4, Apr. 17, 2020, slides 1-9.
Ming Gan et al.: "Sync transmission for non-STR MLD", IEEE 802.11-20/0505-01-00be, Apr. 1, 2020, slides 1-11.
Dmitry Akhmetov et al.: "Discussion on methods for synchronous ML operations", IEEE 802.11-20/993r7, Aug. 2020, slides 1-21.
Yongho Seok et al.: "Synchronous Multi-Link Transmission on Non-STR MLD", IEEE 802.11-20/1053r0, Jul. 28, 2020, slides 1-14.
Yongho Seok: Proposed Draft Text for "MLO Multi-Link Channel Access: PPDU Ending Time Alignment", IEEE 802.11-20/1271r1, Aug. 26, 2020, pp. 1-4.
Office Action dated Feb. 7, 2023 for Korean Patent Application No. 10-2022-7032578 and its English translation provided by the Applicant's foreign counsel.
Yongho Seok et al.: "Proposed Draft Text for MLO Multi-Link Channel Access: PPDU End Time Alignment", IEEE 802.11-20/1271r3, Aug. 30, 2020, pp. 1-4.
Insun Jang et al.: "Operation of Non-AP MLD with Constrains", IEEE 802.11-20/0014r0, Jan. 13, 2020, pp. 1-12.
Office Action dated Mar. 2, 2023 for Indian Patent Application No. 202227050275.
International Preliminary Report on Patentability (Chapter I) for PCT/KR2021/003057 issued on Sep. 6, 2022 and its English translation from WIPO (now published as WO 2021/182902).
Office Action dated Feb. 26, 2024 for Japanese Patent Application No. 2022-554673 and its English translation provided by the Applicant's foreign counsel.
Notice of Allowance dated Mar. 18, 2024 for Korean Patent Application No. 10-2023-7019763 and its English translation provided by the Applicant's foreign counsel.
Office Action dated Sep. 4, 2023 for Japanese Patent Application No. 2022-554673 and its English translation provided by the Applicant's foreign counsel.
Yongho Seok et al.: Proposed Draft Text for "MLO Multi-Link Chann Access: PPDU End Time Alignment", IEEE 802.11-20/1271r6, Aug. 31, 2020, pp. 1-4.
Young Hoon Kwon et al.: "Synchronous Multi-Link Operation", IEEE 802.11-20/0427r0, Apr. 6, 2020, slides 1-9.
Hearing Notice dated Oct. 10, 2024 for Indian Patent Application No. 202227050275.
Office Action dated Nov. 20, 2024 for U.S. Appl. No. 18/513,557.
Office Action (1st) dated Mar. 6, 2025 for Chinese Patent Application No. 202180020467.0 and its English translation provided by Applicant's foreign counsel.
Notice of Allowance dated Mar. 13, 2025 for U.S. Appl. No. 18/513,557.

* cited by examiner

FIG. 8

(a) EHT SU PPDU
(b) EHT TB PPDU
(c) EHT MU PPDU
(d) EHT ER SU PPDU (a) Capabilities element

| ... | Multi-link multi-TID aggregation support | Number of TIDs | ... |
|---|---|---|---|

(b) Operation element

| ... | Permission of Multi-link multi-TID aggregation | Number of TIDs | ... |
|---|---|---|---|

WIRELESS COMMUNICATION METHOD USING MULTIPLE LINKS, AND WIRELESS COMMUNICATION TERMINAL USING SAME

CROSS-REFERENCE TO RELATED APPLICATIONS

The present application is the U.S. National Phase of PCT Application No. PCT/KR2021/003057 filed on Mar. 11, 2021, which claims the priority to Korean Patent Application No. 10-2020-0030442 filed with the Korean Intellectual Property Office on Mar. 11, 2020, Korean Patent Application No. 10-2020-0102019 filed with the Korean Intellectual Property Office on Aug. 13, 2020 and Korean Patent Application No, 10-2020-0108179 filed with the Korean Intellectual Property Office on Aug. 26, 2020, the entire contents of which are incorporated herein by reference.

TECHNICAL FIELD

The present invention relates to a wireless communication method using a multi-link and a wireless communication terminal using the same.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.11ac and 802.11ad, the IEEE 802.11ax (high efficiency WLAN, HEW) standard for providing a high-efficiency and high-performance wireless LAN communication technology in a high-density environment, in which APs and terminals are concentrated, is in the development completion stage. In an 802.11 ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band.

DETAILED DESCRIPTION OF THE INVENTION

Technical Problem

An embodiment of the present invention is for providing a wireless communication method using a multi-link and a wireless communication terminal using the same.

Technical Solution

A multi-link device that uses a plurality of links according to an embodiment of the disclosure may include a transceiver; and a processor. When the multi-link device simultaneously transmits a plurality of PPDUs in a plurality of links using the transceiver, the processor is configured to determine, based on whether the multi-link device transmits a frame that requests an ACK, a transmission end time of the plurality of PPDUs.

When the multi-link device simultaneously transmits a plurality of PPDUs in a plurality of links, the processor is configured to align ends of a plurality of PPDUs that request ACKs among the plurality of PPDUs.

When the multi-link device simultaneously transmits a plurality of PPDUs in a plurality of links, the processor is configured not to align an end of a PPDU including only a frame that does not request an ACK among the plurality of PPDUs with an end of a PPDU including a frame that requests an ACK among the plurality of PPDUs.

Specifically, when the multi-link device simultaneously transmits a plurality of PPDUs in a plurality of links, the processor is configured to transmit the plurality of PPDUs in a manner in which an end of a PPDU including only a frame that does not request an ACK among the plurality of PPDUs is not later than an end of a PPDU including a frame that requests an ACK among the plurality of PPDUs.

Whether the frame that requests an ACK is a frame that requests an ACK may be determined based on an ACK policy.

The frame that requests an ACK is a data frame.

The multi-link device is an AP multi-link device, and the processor is configured to transmit the plurality of PPDUs to a non-AP multi-link device using the transceiver.

In the case that a multi-link device that receives the plurality of PPDUs performs transmission in any one link, the multi-link device is incapable of performing reception in another link.

A multi-link device that uses a plurality of links, according to an embodiment of the disclosure may include a transceiver; and a processor. The processor is configured to enable the multi-link device to simultaneously receive a plurality of PPDUs from a plurality of links using the transceiver. The transmission end time of the plurality of PPDUs may be determined based on whether a frame that requests an ACK is transmitted in the plurality of PPDUs.

The ends of a plurality of PPDUs that request ACKs among the plurality of PPDUs are aligned.

The end of a PPDU including only a frame that does not request an ACK among the plurality of PPDUs may not be aligned with the end of a PPDU including a frame that requests an ACK among the plurality of PPDUs.

The end of a PPDU including only a frame that does not request an ACK among the plurality of PPDUs may not be later than the end of a PPDU including a frame that requests an ACK among the plurality of PPDUs.

Whether the frame that requests an ACK is a frame that requests an ACK may be determined based on an ACK policy.

The frame that requests an ACK may be a data frame.

The multi-link device is a non-AP multi-link device, and the processor is configured to transmit the plurality of PPDUs from an AP multi-link device using the receiver.

In the case that the multi-link device performs transmission in any one link, the multi-link device is incapable of performing reception in another link.

The processor is configured to access a channel using a channel access method that uses a backoff counter in the plurality of links. In this instance, an initial value of the backoff counter is set by an obtained random number, the backoff counter is decreased by one when a channel accessed during a slot time is idle, and when a value of the backoff counter is 0, a station is allowed to access a channel. Even when the backoff counter reaches 0 in a channel access of any one of the plurality of links, the processor may not perform transmission in the any one link.

When not performing transmission in the any one link, the processor may maintain the value of the backoff counter.

A method for operating a multi-link device that uses a plurality of links according to an embodiment of the disclosure may include an operation of simultaneously receiving, by the multi-link device, a plurality of PPDUs from a plurality of links using a transceiver. The transmission end time of the plurality of PPDUs may be determined based on whether a frame that requests an ACK is transmitted in the plurality of PPDUs.

The ends of a plurality of PPDUs that request ACKs among the plurality of PPDUs may be aligned.

Advantageous Effects

An embodiment of the present invention is provides a wireless communication method efficiently using a multi-link and a wireless communication terminal using the same.

BRIEF DESCRIPTION OF THE DRAWINGS

FIG. 8 illustrates an example of various extremely high throughput (EHT) physical protocol data unit (PPDU) formats and a method for indicating the same according to an embodiment of the present invention.

MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

Hereinafter, in the present invention, a field and a subfield may be interchangeably used.

Figure 1:
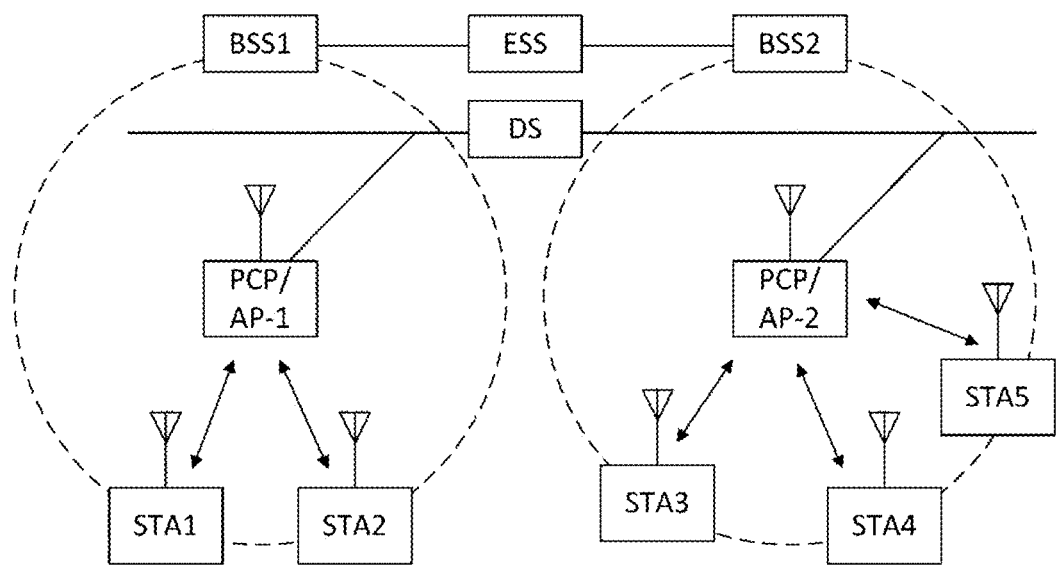
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
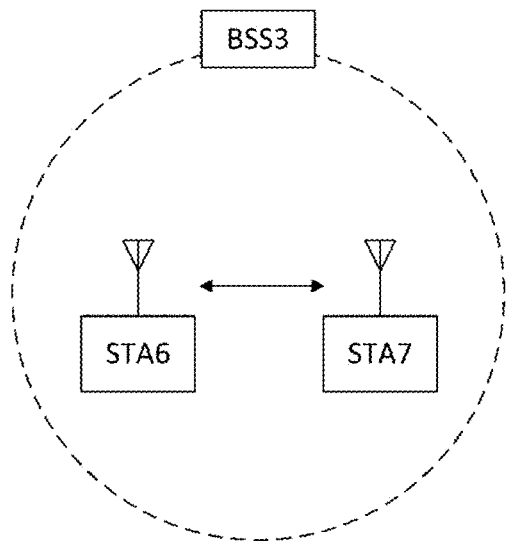
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
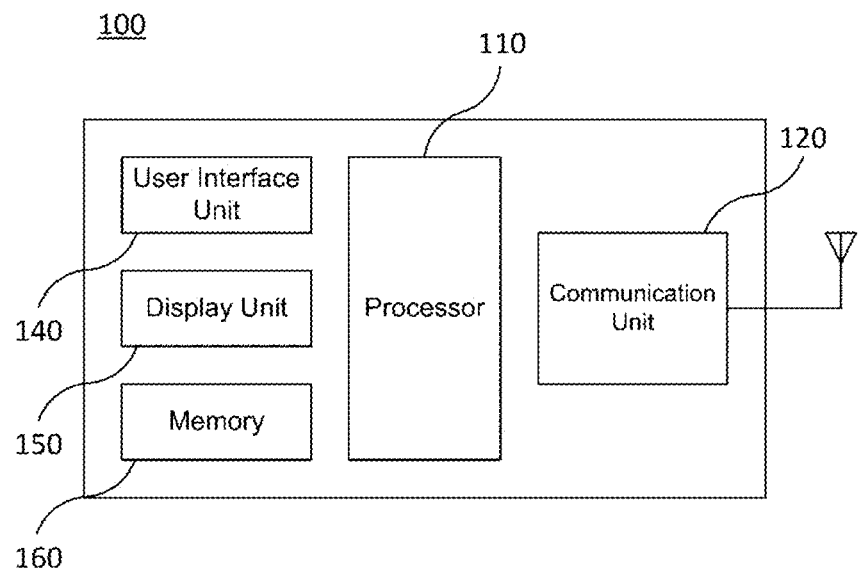
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, 6 GHz and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
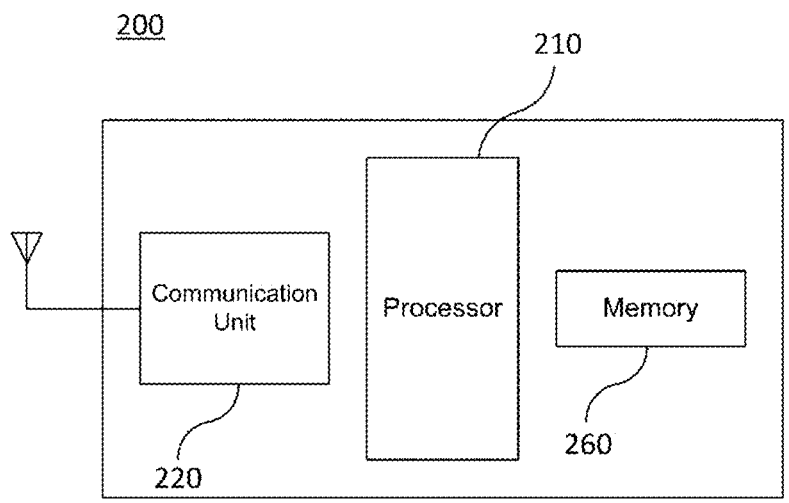
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or 5 correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, 6 GHz and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
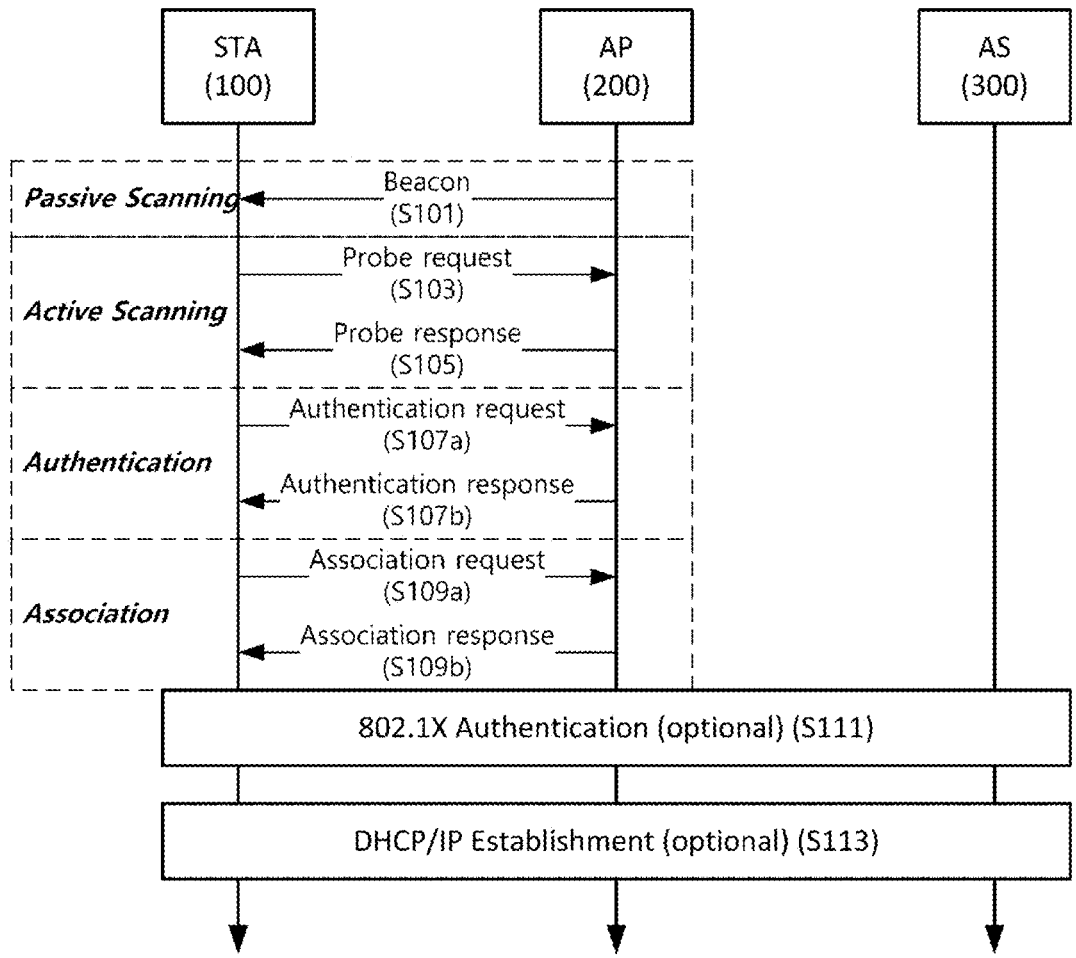
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
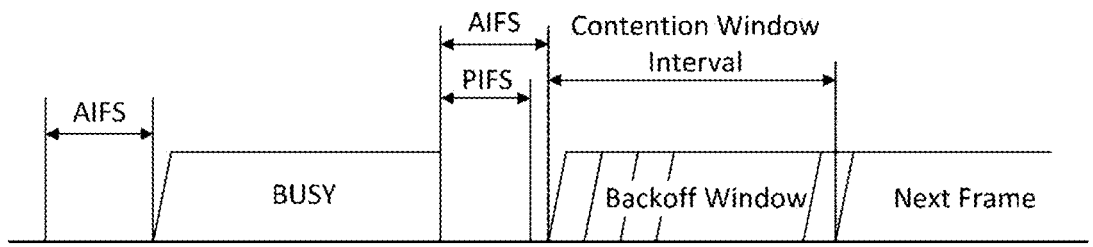
FIG. 6 illustrates a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval. In this instance, a random number is referred to as a backoff counter. That is, the initial value of the backoff counter may be set by an integer number which is a random number that a UE obtains. In the case that the UE detects that a channel is idle during a slot time, the UE may decrease the backoff counter by 1. In addition, in the case that the backoff counter reaches 0, the UE may be allowed to perform channel access in a corresponding channel. Therefore, in the case that a channel is idle during an AIFS time and the slot time of the backoff counter, transmission by the UE may be allowed.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

<Examples of Various PPDU Formats>

Figure 7:
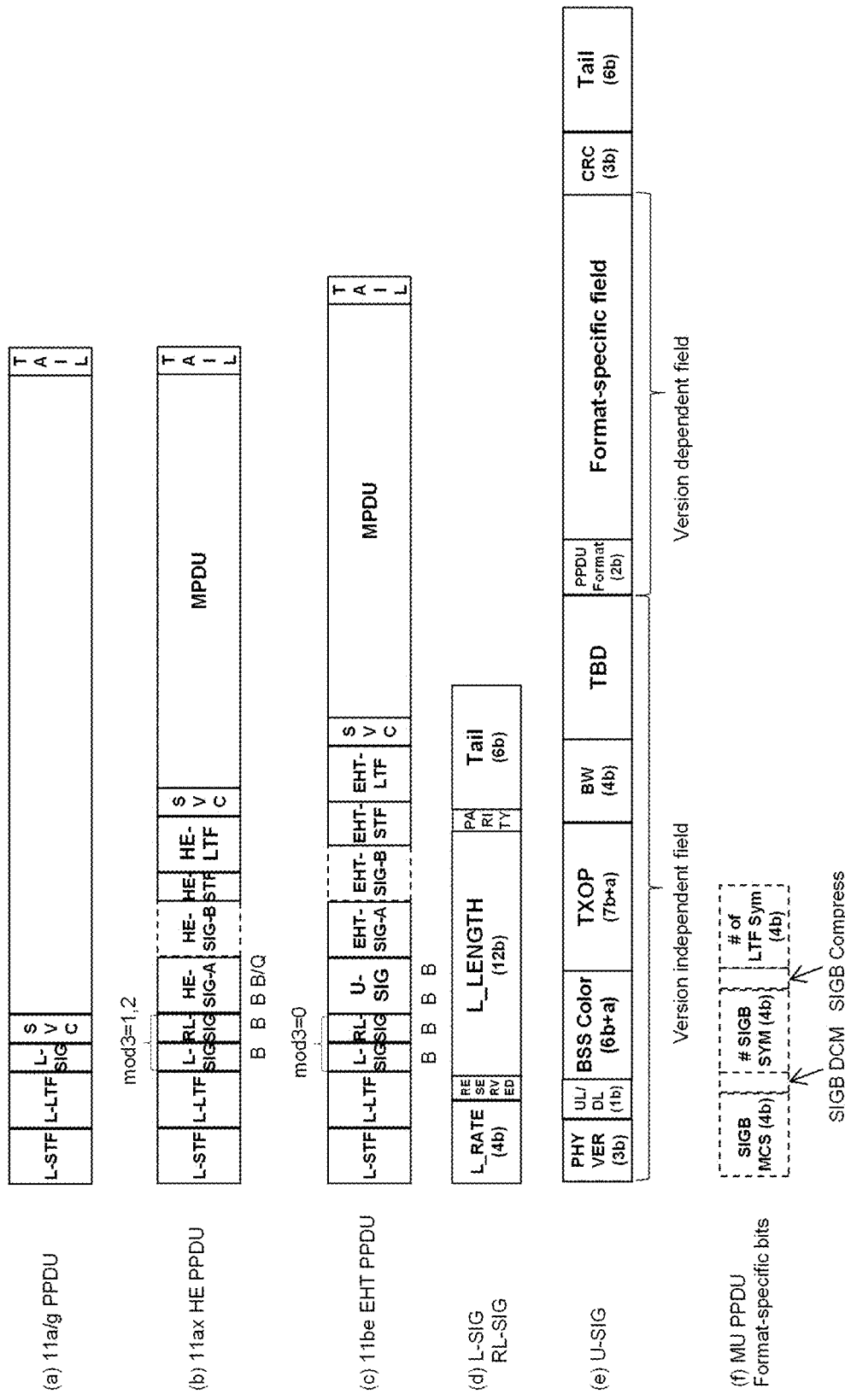
FIG. 7 illustrates an example of a format of a PLCP Protocol data unit (PPDU) for each of various standard generations.

FIG. 7 illustrates an example of a format of a PLCP Protocol data unit (PPDU) for each of various standard generations. More specifically, FIG. 7(a) illustrates an embodiment of a legacy PPDU format based on 802.11a/g, FIG. 7(b) illustrates an embodiment of an HE PPDU format based on 802.11ax, and FIG. 7(c) illustrates an embodiment of a non-legacy PPDU (i.e., EHT PPDU) format based on 802.11be. FIG. 7(d) illustrates detailed field configurations of RL-SIG and L-SIG commonly used in the PPDU formats.

Referring to FIG. 7(a), a preamble of the legacy PPDU includes a legacy short training field (L-STF), a legacy long training field (L-LTF), and a legacy signal field (L-SIG). In an embodiment of the present invention, the L-STF, the L-LTF, and the L-SIG may be referred to as a legacy preamble.

Referring to FIG. 7(b), a preamble of the HE PPDU additionally includes, in the legacy preamble, a repeated legacy short training field (RL-SIG), a high efficiency signal A field (HE-SIG-A), a high efficiency signal B field (HE-SIG-B), a high efficiency short training field (HE-STF), and a high efficiency long training field (HE-LTF). In an embodiment of the present invention, the RL-SIG, HE-SIG-A, the HE-SIG-B, the HE-STF and the HE-LTF may be referred to as an HE preamble. A specific configuration of the HE preamble may be modified according to an HE PPDU format. For example, HE-SIG-B may be used only in an HE MU PPDU format.

Referring to FIG. 7(c), a preamble of the EHT PPDU additionally includes, in the legacy preamble, a repeated legacy short training field (RL-SIG), a universal signal field (U-SIG), and an extremely high throughput signal A field (EHT-SIG-A), an extremely high throughput signal B field (EHT-SIG-B), an extremely high throughput short training field (EHT-STF), and an extremely high throughput long training field (EHT-LTF). In an embodiment of the present invention, the RL-SIG, EHT-SIG-A, the EHT-SIG-B, the EHT-STF and the EHT-LTF may be referred to as an EHT preamble. A specific configuration of a non-legacy preamble may be modified according to an EHT PPDU format. For example, EHT-SIG-A and EHT-SIG-B may be used only in a part of the EHT PPDU format.

64-FFT OFDM is applied in an L-SIG field included in the preamble of the PPDU, and the L-SIG field includes a total of 64 subcarriers. Among 64 subcarriers, 48 subcarriers excluding a guard subcarrier, a DC subcarrier, and a pilot subcarrier are used for transmission of L-SIG data. BPSK and a modulation and coding scheme (MCS) of rate=1/2 are applied in L-SIG, and therefore the L-SIG may include a total of 24 bits of information. FIG. 7(d) illustrates a 24-bit information configuration of L-SIG.

Referring to FIG. 7(d), the L-SIG includes an L_RATE field and an L_LENGTH field. The L_RATE field includes 4 bits and indicates an MCS used for data transmission. Specifically, the L_RATE field indicates one value among transmission rates of 6/9/12/18/24/36/48/54 Mbps obtained by combining a modulation scheme of BPSK/QPSK/16-QAM/64-QAM, etc. and an inefficiency of ½, ⅔, ¾, etc. A total length of a corresponding PPDU may be indicated by combining information of the L_RATE field and information of the L_LENGTH field. In a non-legacy PPDU format, the L_RATE field is configured to a minimum rate of 6 Mbps.

A unit of the L_LENGTH field is a byte and a total of 12 bits are allocated to signal up to 4095, and a length of the PPDU may be indicated in combination with the L_RATE field. A legacy terminal and a non-legacy terminal may interpret the L_LENGTH field in different ways.

First, a method of interpreting the length of a PPDU using a L_LENGTH field by a legacy terminal or a non-legacy terminal is as follows. When the L_RATE field is set to 6 Mbps, 3 bytes (i.e., 24 bits) can be transmitted for 4 us, which is one 5 symbol duration of 64 FFT. Therefore, by adding 3 bytes corresponding to the SVC field and the Tail field to the value of the L_LENGTH field and dividing it by 3 bytes, which is the transmission amount of one symbol, the number of symbols after the L-SIG is obtained on the 64FFT basis. The length of the corresponding PPDU, that is, the reception time (i.e., RXTIME) is obtained by multiplying the obtained number of symbols by 4 us, which is one symbol duration, and then adding a 20 us which is for transmitting L-STF, L-LTF and L-SIG. This can be expressed by the following Equation 1.

$$RXTIME(us) = \left(\left\lceil \frac{L\_LENGTH + 3}{3} \right\rceil\right) \times 4 + 20 \quad \text{[Equation 1]}$$

In this case, denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$L\_LENGTH(byte) = \left(\left\lceil \frac{TXTIME - 20}{4} \right\rceil\right) \times 3 - 3 \quad \text{[Equation 2]}$$

Herein, TXTIME is the total transmission time constituting the corresponding PPDU, and is expressed by Equation 3 below. In this case, TX represents the transmission time of X.

[Equation 3]

$$TXTIME(us) = T_{L\text{-}STF} + T_{L\text{-}LTF} + T_{L\text{-}SIG} + T_{RL\text{-}SIG} + T_{U\text{-}SIG} + (T_{EHT\text{-}SIG\text{-}A}) + (T_{EHT\text{-}SIG\text{-}B}) + T_{EHT\text{-}STF} + N_{EHT\text{-}LTF} \cdot T_{ENT\text{-}LTF} + T_{DATA}$$

Referring to the above equations, the length of the PPDU is calculated based on a rounded up value of L_LENGTH/3. Therefore, for a random value of k, three different values of L_LENGTH={3k+1, 3k+2, 3(k+1)} indicate the same PPDU length.

Referring to FIG. 7(e), a universal SIG (U-SIG) field continues to exist in an EHT PPDU and a WLAN PPDU of a subsequent generation, and serves to classify a generation of a PPDU, which includes 11be. U-SIG is a 64 FFT-based OFDM 2 symbol and may transfer a total of 52 bits of information. In 52 bits, 43 bits excluding 9 bits for CRC/Tail are largely divided into a version independent (VI) field and a version dependent (VD) field.

A VI bit enables a current bit configuration to be maintained even later on, so that even if a PPDU of a subsequent generation is defined, current 11be terminals may obtain information on the PPDU via the VI fields of the PPDU. To this end, the VI field includes PHY version, UL/DL, BSS color, TXOP, and reserved fields. The PHY version field is 3 bits, and serves to sequentially classify 11be and subsequent generation wireless LAN standards into versions. 11be has a value of 000b. The UL/DL field identifies whether the PPDU is an uplink/downlink PPDU. BSS color indicates an identifier for each BSS defined in 11ax, and has a value of 6 bits or more. TXOP indicates transmit opportunity duration transmitted in a MAC header, wherein, by adding the TXOP to a PHY header, the PPDU may infer a length of the TXOP included therein without having to decode an MPDU, and the TXOP has a value of 7 bits or more.

The VD field is signaling information useful only for an 11be version of the PPDU, and may include a field commonly used in any PPDU format, such as PPDU format and BW, and a field defined differently for each PPDU format. The PPDU format is a classifier that classifies EHT single user (SU), EHT multiple user (MU), EHT trigger-based (TB), EHT extended range (ER) PPDU, etc. The BW field signals five basic PPDU BW options (BW, which is expressible in the form of an exponential power of 20*2, may be referred to as basic BW) of 20, 40, 80, 160 (80+80), and 320 (160+160) MHz and various remaining PPDU BWs configured via preamble puncturing. After being signaled at 320 MHz, signaling may be performed in a form in which some 80 MHz is punctured. A punctured and modified channel type may be signaled directly in the BW field, or may be signaled using the BW field with a field (e.g., a field within the EHT-SIG field) appearing after the BW field. If the BW field is configured to 3 bits, a total of 8 BW signaling may be performed, and therefore only up to 3 signaling may be performed in a puncturing mode. If the BW field is configured to 4 bits, a total of 16 BW signaling may be performed, and therefore up to 11 signaling may be performed in the puncturing mode.

A field located after the BW field varies depending on the type and format of the PPDU, an MU PPDU and an SU PPDU may be signaled in the same PPDU format, a field for classification between the MU PPDU and the SU PPDU may be located before an EHT-SIG field, and additional signaling may be performed for the same. Both the SU PPDU and the MU PPDU include the EHT-SIG field, but some fields that are not required in the SU PPDU may be compressed. Information on the field to which the compression has been applied may be omitted or may have a size smaller than a size of an original field included in the MU PPDU. For example, in a case of the SU PPDU, a common field of the EHT-SIG may be omitted or replaced, or the SU PPDU may have a different configuration in which a user specific field is replaced, reduced to one, or the like.

Alternatively, the SU PPDU may further include a compression field indicating whether compression is performed, and a part of field (e.g., RA fields, etc.) may be omitted according to a value of the compressed field.

If a part of the EHT-SIG field of the SU PPDU is compressed, information to be included in the compressed field may be signaled also in an uncompressed field (e.g., the common field, etc.). The MU PPDU corresponds to a PPDU format for concurrent reception by multiple users, and therefore the EHT-SIG field is required to be transmitted subsequently to the U-SIG field, and the amount of signaled information may vary. That is, a plurality of MU PPDUs are transmitted to a plurality of STAs, so that the respective STAs should recognize locations of RUs, at which the MU PPDUs are transmitted, the STAs to which the RUs have been allocated respectively, and whether the transmitted MU PPDUs have been transmitted to the STAs themselves. Therefore, an AP should transmit information described above, by including the same in the EHT-SIG field. To this end, information for efficient transmission of the EHT-SIG field is signaled in the U-SIG field, and this may correspond to an MCS that is a modulation method and/or the number of symbols in the EHT-SIG field. The EHT-SIG field may include information on a size and location of an RU allocated to each user.

In the case of the SU PPDU, a plurality of RUs may be allocated to an STA, and the plurality of RUs may be continuous or discontinuous. If the RUs allocated to the STA are discontinuous, the STA should recognize a punctured RU in the middle in order to efficiently receive the SU PPDU. Accordingly, the AP may transmit the SU PPDU including information (e.g., a puncturing pattern of the RUs, etc.) of punctured RUs among the RUs allocated to the STA. That is, in the case of the SU PPDU, a puncturing mode field, which includes information indicating, in a bitmap format, etc., a puncturing pattern and whether the puncturing mode is applied, may be included in the EHT-SIG field, and the puncturing mode field may signal a discontinuous channel type appearing within a bandwidth.

The signaled discontinuous channel type is limited, and indicates discontinuous channel information and BW of the SU PPDU in combination with a value of the BW field. For example, the SU PPDU is a PPDU transmitted only to a single terminal, so that the STA may recognize a bandwidth allocated to itself via the BW field included in the PPDU, and the SU PPDU may recognize a punctured resource in the allocated bandwidth via the puncturing mode field of the EHT-SIG field or the U-SIG field included in the PPDU. In this case, the terminal may receive the PPDU in resource units remaining after excluding a specific channel of the punctured resource unit. The plurality of RUs allocated to the STA may be configured by different frequency bands or tones.

Only a limited discontinuous channel type is signaled in order to reduce signaling overhead of the SU PPDU. Puncturing may be performed for each 20 MHz sub-channel, so that if puncturing is performed for BW having a large number of 20 MHz sub-channels, such as 80, 160, and 320 MHz, a discontinuous channel (if puncturing of only edge 20 MHz is considered to be discontinuous) type should be signaled in the case of 320 MHz by expressing whether each of 15 20 MHz sub-channels remaining after excluding a primary channel is used. As such, allocating 15 bits to signal a discontinuous channel type of single user transmission may act as excessively large signaling overhead in consideration of a low transmission rate of a signaling part.

The present invention proposes a technique for signaling a discontinuous channel type of an SU PPDU, and illustrates a discontinuous channel type determined according to the proposed technique. The present invention also proposes a technique for signaling each of puncturing types of primary 160 MHz and secondary 160 MHz in a 320 MHz BW configuration of an SU PPDU.

An embodiment of the present invention proposes a technique for differently configuring a PPDU indicated by preamble puncturing BW values according to a PPDU format signaled in a PPDU format field. It is assumed that a BW field is 4 bits, and in a case of an EHT SU PPDU or a TB PPDU, EHT-SIG-A of 1 symbol may be additionally signaled after U-SIG, or EHT-SIG-A may not be signaled at all, so that, in consideration of this, it is necessary to completely signal up to 11 puncturing modes via only the BW field of U-SIG. However, in a case of an EHT MU PPDU, EHT-SIG-B is additionally signaled after U-SIG, so that up to 11 puncturing modes may be signaled in a method different from that of the SU PPDU. In a case of an EHT ER PPDU, a BW field may be configured to 1 bit to signal whether the EHT ER PPDU is a PPDU using a 20 MHz or 10 MHz band.

FIG. 7(f) illustrates a configuration of a format-specific field of a VD field when the EHT MU PPDU is indicated in the PPDU format field of U-SIG. In the case of the MU PPDU, SIG-B, which is a signaling field for concurrent reception by multiple users, is essentially required, and SIG-B may be transmitted without separate SIG-A after U-SIG. To this end, information for decoding of SIG-B should be signaled in U-SIG. These fields include SIG-B MCS, SIG-B DCM, Number of SIG-B Symbols, SIG-B Compression, and Number of EHT-LTF Symbols.

Figure 8:
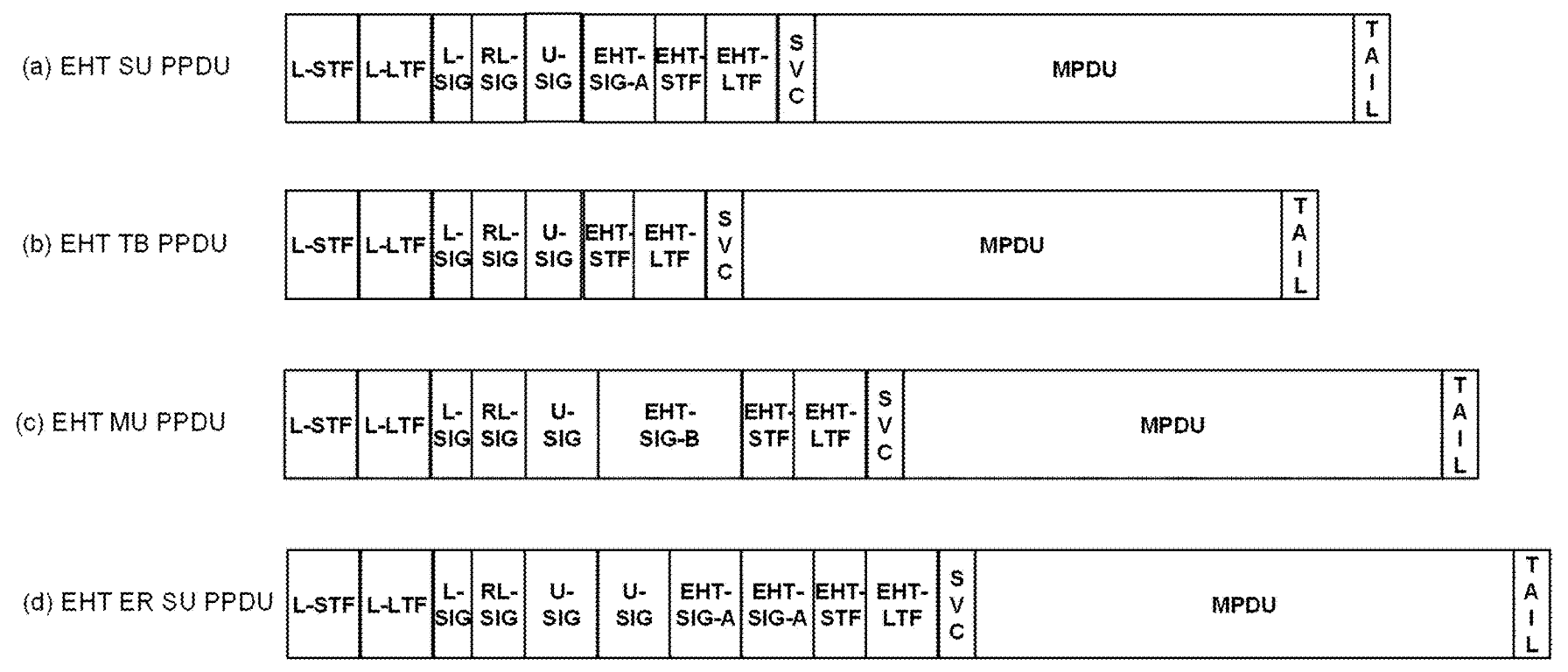

FIG. 8 illustrates an example of various extremely high throughput (EHT) physical protocol data unit (PPDU) formats and a method for indicating the same according to an embodiment of the present invention.

Referring to FIG. 8, a PPDU may include a preamble and a data part, and an EHT PPDU format, that is a PPDU type, may be classified according to a U-SIG field included in the preamble. Specifically, based on a PPDU format field included in the U-SIG field, whether the format of the PPDU is an EHT PPDU may be indicated.

FIG. 8(a) shows an example of an EHT SU PPDU format for a single STA. An EHT SU PPDU is a PPDU used for single user (SU) transmission between an AP and a single STA, and an EHT-SIG-A field for additional signaling may be located after the U-SIG field.

FIG. 8(b) shows an example of an EHT trigger-based PPDU format which corresponds to an EHT PPDU transmitted based on a trigger frame. An EHT Trigger-based PPDU is an EHT PPDU transmitted based on a trigger frame and is an uplink PPDU used for a response to the trigger frame. Unlike in the EHT SU PPDU, an EHT-SIG-A field is not located after a U-SIG field in the EHT PPDU.

FIG. 8(c) shows an example of an EHT MU PPDU format which corresponds to an EHT PPDU for multiple users. An EHT MU PPDU is a PPDU used to transmit the PPDU to one or more STAs. In the EHT MU PPDU format, an HE-SIG-B field may be located after a U-SIG field.

FIG. 8(d) shows an example of an EHT ER SU PPDU format used for single user transmission with an STA in an extended range. An EHT ER SU PPDU may be used for single user transmission with an STA of a wider range compared to the EHT SU PPDU described in FIG. 8(a), and a U-SIG field may be repeatedly located on a time axis.

The EHT MU PPDU described in FIG. 8(c) may be used by an AP to perform downlink transmission to a plurality of STAs. Here, the EHT MU PPDU may include scheduling information so that the plurality of STAs may concurrently receive the PPDU transmitted from the AP. The EHT MU PPDU may transfer, to the STAs, AID information of a transmitter and/or a receiver of the PPDU transmitted via a user specific field of EHT-SIG-B. Accordingly, the plurality of terminals having received the EHT MU PPDU may perform a spatial reuse operation based on the AID information of the user specific field included in a preamble of the received PPDU.

Specifically, a resource unit allocation (RA) field of the HE-SIG-B field included in the HE MU PPDU may include information on a configuration of a resource unit (e.g., a division form of the resource unit) in a specific bandwidth (e.g., 20 MHz, etc.) of a frequency axis. That is, the RA field may indicate configurations of resource units segmented in a bandwidth for transmission of the HE MU PPDU, in order for the STA to receive the PPDU. Information on the STA allocated (or designated) to each segmented resource unit may be included in the user specific field of EHT-SIG-B so as to be transmitted to the STA. That is, the user specific field may include one or more user fields corresponding to the respective segmented resource units.

For example, a user field corresponding to at least one resource unit used for data transmission among the plurality of segmented resource units may include an AID of a receiver or a transmitter, and a user field corresponding to the remaining resource unit(s) which is not used for data transmission may include a preconfigured null STA ID.

When one wireless communication device communicates by using a plurality of links, the communication efficiency of the wireless communication device may be increased. In this case, the link may be a physical path, and may consist of one wireless medium that may be used to deliver a MAC service data unit (MSDU). For example, in a case where frequency band of one of the links is in use by another wireless communication device, the wireless communication device may continue to perform communication through another link. As such, the wireless communication device may usefully use a plurality of channels. In addition, when the wireless communication device performs communication simultaneously by using a plurality of links, the overall throughput may be increased. However, in the existing wireless LAN, it has been stipulated that one wireless communication device uses one link. Therefore, a WLAN operation method for using a plurality of links is required. A wireless communication method of a wireless communication device using a plurality of links will be described through FIGS. 9 to 26. First, a specific form of a wireless communication device using a plurality of links will be described through FIG. 9.

Figure 9:
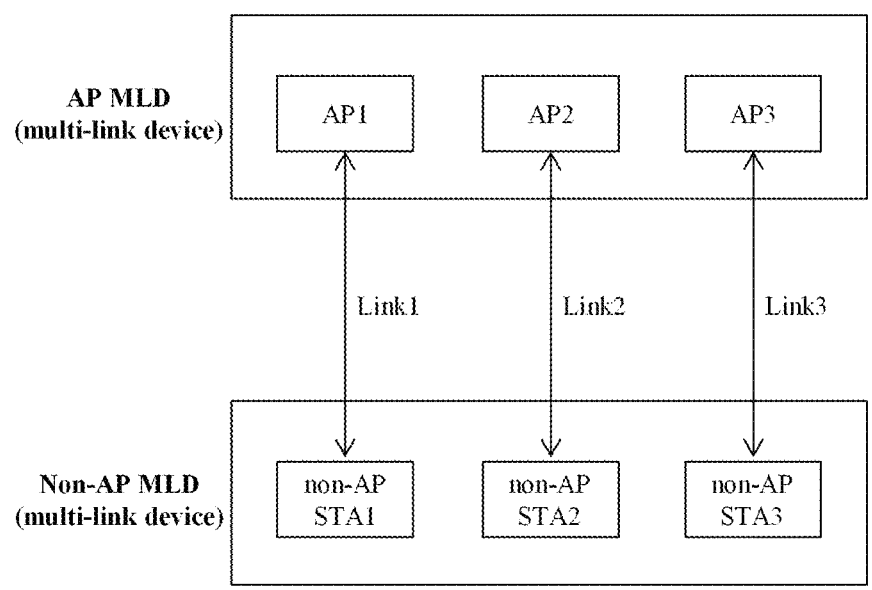
FIG. 9 illustrates a multi-link device according to an embodiment of the disclosure.

FIG. 9 illustrates a multi-link device according to an embodiment of the disclosure.

A multi-link device (MLD) may be defined for a wireless communication method using the plurality of links described above. The multi-link device may represent a device having one or more affiliated stations. According to a specific embodiment, the multi-link device may represent a device having two or more affiliated stations. In addition, the multi-link device may exchange multi-link elements. The multi-link element includes information on one or more stations or one or more links. The multi-link element may include a multi-link setup element, which will be described later. In this case, the multi-link device may be a logical entity. Specifically, the multi-link device may have a plurality of affiliated stations. The multi-link device may be referred to as a multi-link logical entity (MLLE) or a multi-link entity (MLE). The multi-link device may have one medium access control (MAC) service access point (SAP) up to logical link control (LLC). The MLD may also have one MAC data service.

A plurality of stations included in the multi-link device may operate on a plurality of links. In addition, a plurality of stations included in the multi-link device may operate on a plurality of channels. Specifically, the plurality of stations included in the multi-link device may operate on a plurality of different links or on a plurality of different channels. For example, a plurality of stations included in the multi-link device may operate on a plurality of different channels of 2.4 GHz, 5 GHz, and 6 GHz.

The operation of the multi-link device may be referred to as a multi-link operation, an MLD operation, or a multi-band operation. In addition, when the station affiliated with the multi-link device is an AP, the multi-link device may be referred to as the AP MLD. In addition, when the station affiliated with the multi-link device is a non-AP station, the multi-link device may be referred to as a non-AP MILD.

FIG. 9 illustrates an operation in which a non-AP MLD and an AP-MLD communicate. Specifically, the non-AP MLD and the AP-MLD communicate by using three links, respectively. The AP MLD includes a first AP AP1, a second AP AP2, and a third AP AP3. The non-AP MLD includes a first non-AP STA (non-AP STA1), a second non-AP STA (non-AP STA2), and a third non-AP STA (non-AP STA3). The first AP AP1 and the first non-AP STA (non-AP STA1) communicate through a first link Link1. In addition, the second AP AP2 and the second non-AP STA (non-AP STA2) communicate through a second link Link2. In addition, the third AP AP3 and the third non-AP STA (non-AP STA3) communicate through a third link Link3.

The multi-link operation may include a multi-link setup operation. The multi-link setup may correspond to an association operation of the single link operation described above and may be preceded first for frame exchange in the multi-link. The multi-link device may obtain information necessary for the multi-link setup from a multi-link setup element. Specifically, the multi-link setup element may include capability information associated with the multi-link. In this case, the capability information may include information indicating whether any one of the plurality of devices included in the multi-link device performs the transmission and simultaneously, another device may perform the reception. In addition, the capability information may include information on the links available to each station 5 included in the MLD. In addition, the capability information may include information on the channels available to each station included in the MLD.

The multi-link setup may be set up through negotiation between peer stations. Specifically, the multi-link setup may be performed through communication between stations without communication with the AP. In addition, the multi-link setup may be set up through any one link. For example, even if the first link to the third link are set through the multi-link, the multi-link setup may be performed through the first link.

In addition, a mapping between a traffic identifier (TID) and a link may be set up. Specifically, frames corresponding to a TID of a particular value may only be interchanged through a pre-specified link. The mapping between the TID and the link may be set up with directional-based. For example, when a plurality of links is set up between the first multi-link device and the second multi-link device, the first multi-link device may be set to transmit a frame of the first TID to the plurality of first links, and the second multi-link device may be set to transmit a frame of the second TID to the first link. In addition, there may be a default setting for the mapping between the TID and the link. Specifically, in the absence of additional setup in the multi-link setup, the multi-link device may exchange frames corresponding to the TID at each link according to the default setting. In this case, the default setting may be that all the TIDs are exchanged in any one link.

A TID will be described in detail. The TID is an ID for classifying traffic and data in order to support quality of service (QoS). In addition, the TID may be used or allocated in a higher layer than a MAC layer. In addition, the TID may indicate a traffic category (TC) or a traffic stream (TS). In addition, the TID may be classified as 16 types. For example, the TID may be designated as one of the values in the range of 0 to 15. A TID value to be used may be differently designated according to an access policy and a channel access or medium access method. For example, in the case that enhanced distributed channel access (EDCA) or hybrid coordination function contention based channel access (HCAF) is used, the TID may be assigned with a value in the range of 0 to 7. In the case that the EDCA is used, the TID may indicate a user priority (UP). In this instance, the UP may be designated based on a TC or a TS. The UP may be allocated in a higher layer than MAC. In addition, in the case that HCF controlled channel access (HCCA) or SPCA is used, the TID may be assigned with a value in the range of 8 to 15. In the case that the HCCA or SPCA is used, the TID may indicate a TSID. In addition, in the case that the HEMM or the SEMM is used, the TID may be assigned with a value in the range of 8 to 15. In the case that the HEMM or SEMM is used, the TID may indicate a TSID.

A UP and an AC may be mapped. The AC may be a label for providing a QoS in EDCA. The AC may be a label for indicating an EDCA parameter set. An EDCA parameter or an EDCA parameter set may be a parameter used for EDCA channel contention. A QoS station may guarantee a QoS using the AC. In addition, the AC may include AC_BK, AC_BE, AC_VI, and AC_VO. The AC_BK, AC_BE, AC_VI, and AC_VO may indicate a background, a best effort, a video, and a voice, respectively. In addition, each of the AC_BK, AC_BE, AC_VI, and AC_VO may be classified into subordinate ACs. For example, the AC_VI may be subdivided into AC_VI primary and AC_VI alternate. In addition, the AC_VO may be subdivided into AC_VO primary and AC_VO alternate. In addition, a UP or a TID may be mapped to an AC. For example, a UP or TID having a value of 1, 2, 0, 3, 4, 5, 6, and 7 may be mapped to AC_BK, AC_BK, AC_BE, AC_BE, AC_VI, AC_VI, AC_VO, and AC_VO, respectively. In addition, a UP or TID having a value of 1, 2, 0, 3, 4, 5, 6, and 7 may be mapped to AC_BK, AC_BK, AC_BE, AC_BE, AC_VI alternate, AC_VI primary, AC_VO primary, and AC_VO alternate, respectively. In addition, a UP or TID having a value of 1, 2, 0, 3, 4, 5, 6, and 7 may sequentially have a high priority. That is, 1 denotes a low priority and 7 denotes a high priority. Therefore, AC_BK, AC_BE, AC_VI, and AC_VO may have high priorities, sequentially. In addition, AC_BK, AC_BE, AC_VI, and AC_VO may correspond to an AC index (ACI) 0, 1, 2, and 3, respectively. Due to such features of a TID, a mapping between a TID and a link may indicate a mapping between an AC and a link. In addition, a mapping between a link and an AC may indicate a mapping between a TID and a link.

As described above, a TID may be mapped to each of a plurality of links. Mapping may be designating a link in which traffic corresponding to a predetermined TID or AC is capable of being exchanged. In addition, a TID or AC that is transmittable for each transmission direction in a link may be designated. As described above, there may be a default configuration for a mapping between a TID and a link. Specifically, in the case that an additional configuration does not exist for a multi-link configuration, a multi-link device may exchange a frame corresponding to a TID in each link according to the default configuration. In this instance, the default configuration may be exchanging all TIDs in any one link. Any TID or AC at any point in time may be always mapped to at least any one link. A management frame and a control frame may be transmitted in all links.

In the case that a link is mapped to a TID or an AC, only a data frame corresponding to the TID or AC mapped to the corresponding link may be transmitted in the corresponding link. Therefore, in the case that a link is mapped to a TID or an AC, a frame that does not correspond to the TID or AC mapped to the corresponding link may not be transmitted in the corresponding link. In the case that a link is mapped to a TID or an AC, an ACK may also be transmitted based on the link to which the TID or the AC is mapped. For example, a block ACK agreement may be determined based on a mapping between a TID and a link. According to another embodiment, a mapping between a TID and a link may be determined based on a block ACK agreement. Particularly, a block ACK agreement may be set for a TID mapped to a predetermined link.

A QoS may be guaranteed via the above-described mapping between a TID and a link. Specifically, an AC or TID having a high priority may be mapped to a link in which a relatively small number of stations operate or a link having a good channel condition. In addition, via the above-described mapping between a TID and a link, a station may be enabled to maintain a power-saving state during a long period of time.

Figure 10:
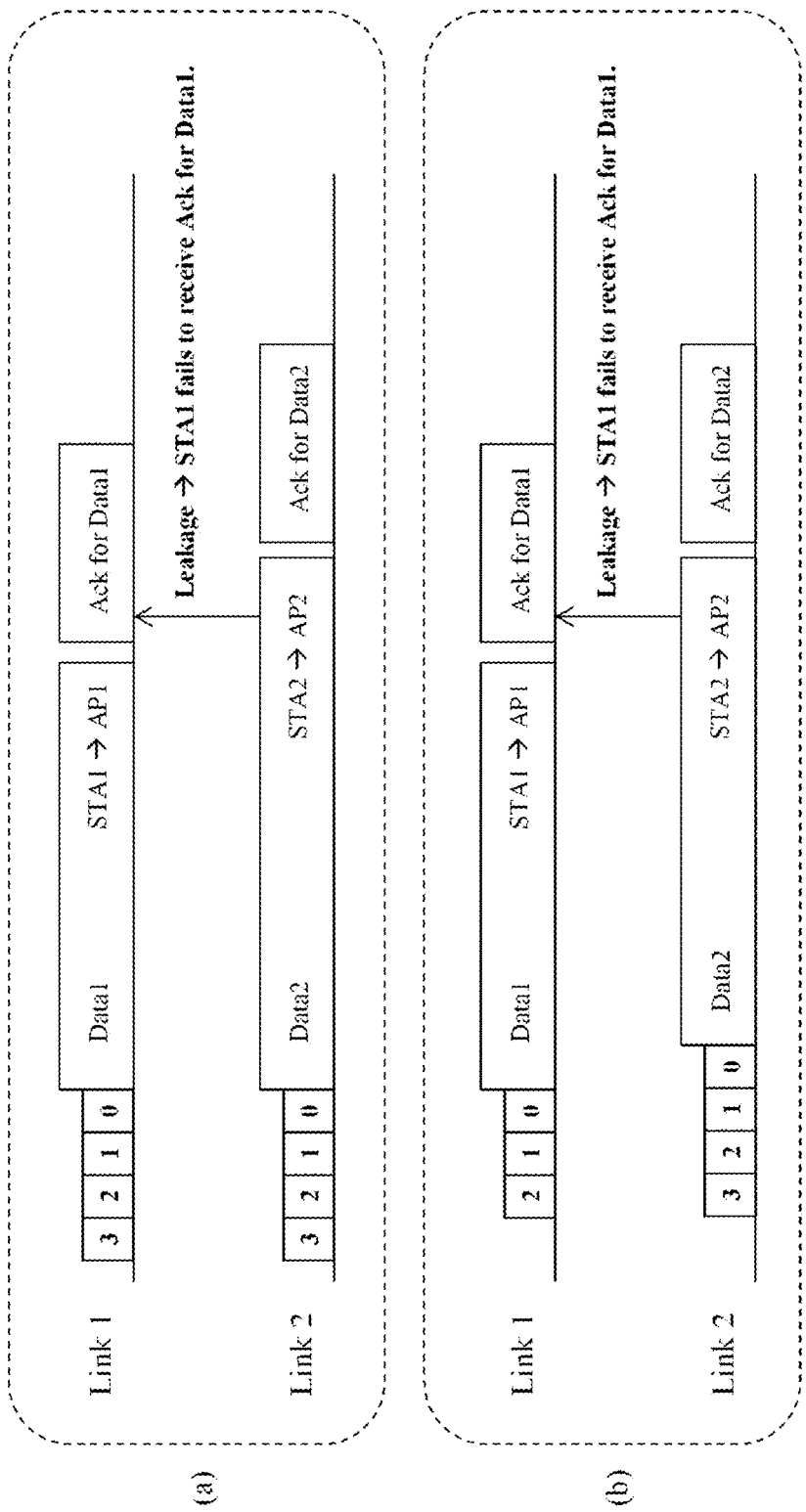
FIG. 10 is a diagram illustrating the case in which transmission in different links are simultaneously performed in a multi-link operation according to an embodiment of the disclosure.

FIG. 10 is a diagram illustrating the case in which transmission in different links are simultaneously performed in a multi-link operation according to an embodiment of the disclosure.

According to implementation of a multi-link device, the multi-link device may simultaneously perform transmission in a plurality of links, may simultaneously perform reception in a plurality of links, or may perform transmission in any one link and may not support reception in another link at the same time. This is because reception or transmission performed in any one link may affect reception or transmission performed in another link. Specifically, transmission in one link may act as interference in another link. Interference from one link of a single multi-link device applied to another link may be referred to as an internal leakage. When the frequency interval between links is small, an internal leakage may be high. In the case that the magnitude of an internal leakage is not too high while transmission is performed in any one link, transmission is capable of being performed in another link. In the case that the magnitude of an internal leakage is too high while transmission is performed in any one link, transmission is incapable of being performed in another link. As described above, the case in which the multi-link device simultaneously performs transmission in a plurality of links, the multi-link device performs transmission in any one link, and at the same time, performs reception in another link, or the multi-link device simultaneously performs reception in a plurality of links may be referred to as STR (simultaneous transmit and receive, simultaneous transmission and reception). As described above, the multi-link device may not support STR. According to another detailed embodiment, the multi-link device may restrictively support STR. Specifically, the multi-link device may support STR only under a predetermined condition. For example, in the case that the multi-link device operates using a single radio, the multi-link device may be incapable of performing STR. In addition, in the case that the multi-link device operates using a single antenna, the multi-link device may be incapable of performing STR. In addition, in the case that the magnitude of an internal leakage is detected as being greater than or equal to a predetermined magnitude, the multi-link device may be incapable of performing STR.

A station may exchange information associated with STR capability of the station with another station. Specifically, the station may exchange, with another station, information associated with whether the station capability of performing transmission or reception in a plurality of links is restrictive. Specifically, the information associated with the capability of performing transmission or reception in a plurality of links is restrictive may indicate whether simultaneous transmission in a plurality of links, simultaneous reception in a plurality of links, or simultaneous transmission and reception in a plurality of links is capable of being performed. In addition, the information associated with whether the capability of performing transmission or reception in a plurality of links is restrictive may be information indicated for each level. Specifically, the information associated with whether the capability of performing transmission or reception in a plurality of links is restrictive may be information indicating a level representing the magnitude of an internal leakage. According to a detailed embodiment, the information indicating the level representing the magnitude of an internal leakage may be information indicating a level representing the magnitude of interference caused due to the internal leakage. According to another detailed embodiment, that may be information indicating a level representing a frequency interval between links that may affect an internal leakage. In addition, the information indicating the level representing the magnitude of an internal leakage may be information indicating the relationship between an internal leakage and a frequency interval between links for each level.

In FIG. 10, a first station (STA1) and a second station (STA2) may be affiliated with a single non-AP multi-link device. In addition, a first AP (AP1) and a second AP (AP2) may be affiliated with the single non-AP multi-link device. A first link (Link 1) may be set up between the first AP (AP1) and the first station (STA1), and a second link (Link 2) may be set up between the second AP (AP2) and the second station (STA2). The non-AP multi-link device may restrictively perform STR. In the case that the second station (STA2) performs transmission in the second link (link 2), reception performed by the first station (STA1) in the first link (Link 1) may be disturbed. For example, the second station (STA2) may transmit first data (Data1) in the second link (Link 2), and the first AP (AP1) transmits, to the first station (STA1), a response (ACK for Data1) to the first data (Data1). The second station (STA2) transmits second data (Data2) in the second link (Link 2). In this instance, a transmission time of the second data (Data2) and a transmission time of the response (ACK for Data1) to the first data (Data1) may overlap. In this instance, due to the transmission to the second station (STA2) in the second link (Link2), interference in the first link (Link 1) may occur. Therefore, the first station (STA1) may not receive the response (ACK for Data1) to the first data (Data1). FIG. 10A illustrates the case in which transmission simultaneously starts in a plurality of links. However, as shown in FIG. 10B, transmission may start at different points in time in a plurality of links.

Specifically, a multi-link device may independently perform channel access for example, backoff, in a plurality of links. In this instance, simultaneous transmission in the plurality of links may start when a backoff counter in the plurality of links reaches 0. According to another detailed embodiment, in the case that the backoff counter of any one link of the multi-link device reaches 0, the multi-link device may perform only energy detection (ED) in a link different from the corresponding link, and may perform channel access. In the case that energy greater than or equal to a predetermined magnitude is not detected, the multi-link device may perform channel access in a link in which energy detection is performed. Through the above, the multi-link device may start simultaneous transmission in a plurality of links. The magnitude of a threshold value used for energy detection may be lower than the magnitude of a threshold value used for determining whether to decrease a backoff counter. In addition, in the case of determining whether to decrease a backoff counter, a station may detect any type of signal, as well as, a wireless LAN signal. In addition, in the above-described energy detection, the station may detect any type of signal, as well as, a wireless LAN signal. An internal leakage may not be detected via a wireless LAN signal. In this instance, the station may sense a signal detected due to an internal leakage via energy detection. In addition, as described above, the magnitude of a threshold value used for energy detection may be lower than the magnitude of a threshold value used for determining whether to decrease a backoff counter. Therefore, although transmission is being performed in another link, the multi-link device may decrease a backoff counter in any one link as shown in FIG. 10A and FIG. 10B.

An operation method in the case that STR of the multi-link device is restricted will be described with reference to FIGS. 11 to 25. However, the embodiments of the disclosure may also be applied although STR of the multi-link device is not restricted.

With reference to FIGS. 11 to 15, the case in which a plurality of PPDUs are simultaneously transmitted or are capable of being simultaneously transmitted in a plurality of links will be described. In addition, the embodiments described with reference to FIGS. 11 to 15 may be applied when STR is unavailable in a plurality of links in which a plurality of PPDUs are transmitted. In the case that a multi-link device that receives a plurality of PPDUs performs transmission in any one link but is incapable of performing reception in another link, the embodiments described with reference to FIGS. 11 to 15 may be applicable. In the case that the multi-link device that transmits a plurality of PPDUs performs transmission in any one link but is incapable of performing reception in another link, the embodiments described with reference to FIGS. 11 to 15 may be applicable.

Figure 11:
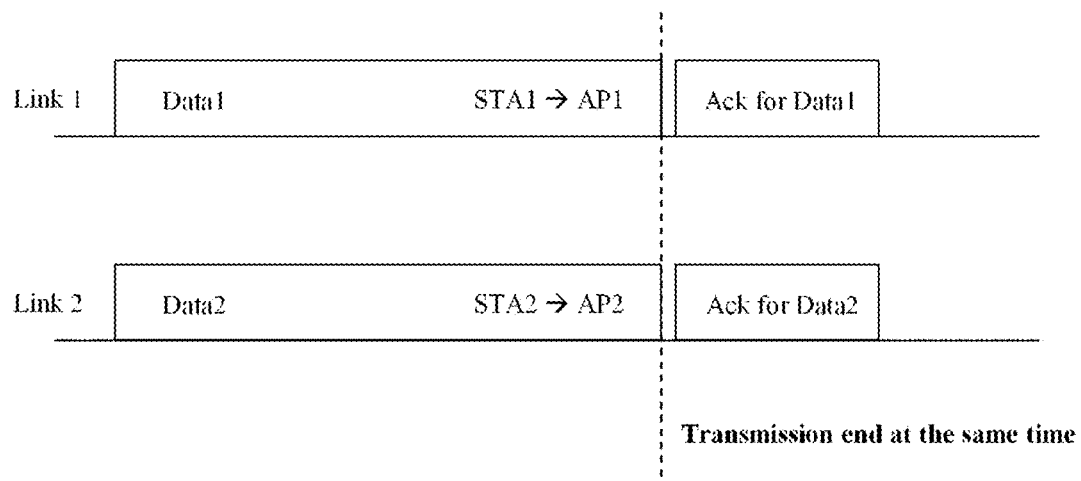
FIG. 11 is a diagram illustrating an operation of simultaneously terminating transmission in a plurality of links, by a multi-link device according to an embodiment of the disclosure.

FIG. 11 is a diagram illustrating an operation of simultaneously terminating transmission in a plurality of links, by a multi-link device according to an embodiment of the disclosure.

In the case that the multi-link device performs transmission in a plurality of links, the multi-link device may terminate simultaneous transmission in the plurality of links. Specifically, the end time of PPDUs transmitted in the plurality of links may be the same. In addition, such an embodiment may be applied to the case in which simultaneous transmission is not started, in addition to the case in which the multi-link device starts simultaneous transmission in a plurality of links. Such an operation may be for a multi-link device that is incapable of simultaneously performing transmission and reception. For example, this may be an operation for the case in which the multi-link device that receives a plurality of PPDUs is incapable of simultaneously performing transmission and reception. Alternatively, this may be an operation for the case in which the multi-link device that transmits a plurality of PPDUs is incapable of simultaneously performing transmission and reception. Specifically, as shown in FIG. 10A, this may prevent failure of the reception of an ACK in another link, while transmission is performed in any one link. Therefore, in the case that, while performing transmission in any one link, the multi-link device does not support performing reception in another link, the multi-link device may terminate simultaneous transmission in a plurality of links.

While a response frame to transmission by the multi-link device is transmitted in one link, the multi-link device may enable transmission in another link not to be performed. Specifically, based on whether a frame transmitted by the multi-link device requests an ACK, the multi-link device may determine a transmission end time in a plurality of links. Based on whether a frame transmitted by the multi-link device requests an ACK, the multi-link device may terminate simultaneous transmission in a plurality of links. That is, based on whether a frame included in at least one of the plurality of PPDUs requests an ACK, simultaneous transmission may be terminated in the plurality of links. Whether a frame requests an ACK may be determined according to an ACK policy. For example, in the case that the ACK policy of a frame is "No ACK", the multi-link device may determine that the frame does not request an ACK. In addition, in the case that the type and the sub-type of frame correspond to "Action No ACK frame", the multi-link device may determine that the frame does not request an ACK. The ACK policy and the type and sub-type of a frame may be indicated by a MAC header of the frame. As illustrated in the embodiment of FIG. 11, a frame that requests an ACK may be a data frame. Specifically, the frame that requests an ACK may be a QoS data frame. This is because information indicating the ACK policy may be included in the QoS data frame.

In the embodiment of FIG. 11, while performing transmission in any one link, the multi-link device may be incapable of performing reception in another link. A first station (STA1) and a second station (STA2) of the multi-link device may transmit first data (Data1) and second data (Data2), respectively. The first station (STA1) and the second station (STA2) may simultaneously terminate the transmission of the first data (Data1) and the second data (Data2), respectively. Therefore, a response (Ack for Data1) to the first data and a response (Ack for Data2) to the second data may be simultaneously transmitted without an internal leakage, and the multi-link device may simultaneously receive the response (ACK for Data1) to the first data and the response (ACK for Data2) to the second data.

Figure 12:
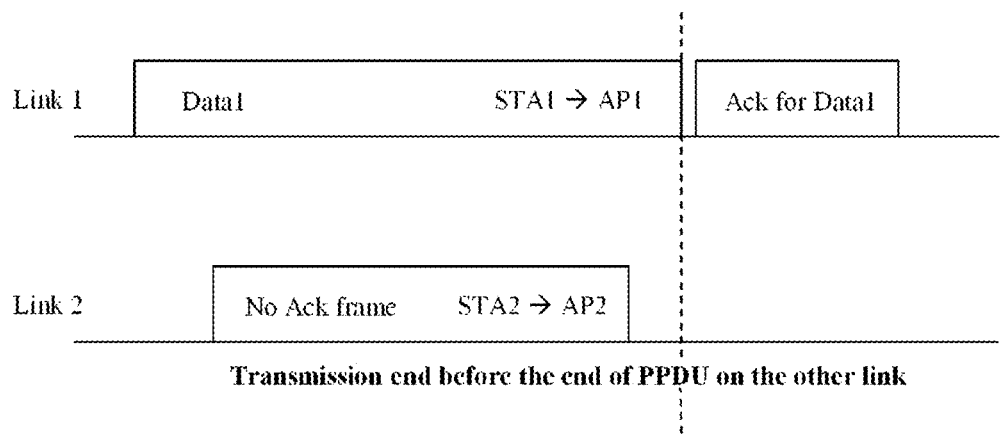
FIG. 12 is a diagram illustrating an operation of terminating, by a multi-link device, transmission in any one link first when the multi-link device according to an embodiment of the disclosure performs transmission in a plurality of links.

FIG. 12 is a diagram illustrating an operation of terminating, by a multi-link device, transmission in any one link first when the multi-link device according to an embodiment of the disclosure performs transmission in a plurality of links.

In the case that, while performing transmission in any one link, the multi-link device starts transmission in another link or starts simultaneous transmission in a plurality of links, the multi-link device may not be allowed to terminate the transmission in the another link later than the transmission in the any one link. Therefore, the multi-link device may terminate the transmission in the another link earlier than or at the same time of the termination of the transmission in the any one link. Specifically, in the case that, while performing transmission in any one link, the multi-link device starts transmission in another link and does not expect a response frame with respect to a frame transmitted in the another link, the multi-link device may terminate the transmission in the another link earlier than or at the same time of the transmission in the any one link. In this instance, the response frame may be an immediate response frame. The immediate response frame may correspond to the case in which the interval between a frame and a response frame falls within a predetermined time interval. In this instance, the predetermined time interval may be an SIFS. In addition, the case in which a response frame is not expected may include the case in which an ACK is not requested that has been described with reference to FIG. 11. Specifically, a frame that requests an immediate response frame may include a frame that requests an ACK. In addition, the frame that requests an immediate response may include a frame that triggers uplink transmission. In addition, the frame that requests an immediate response may include a QoS data frame that requests an immediate response. In addition, the frame that requests an immediate response may include a control frame that requests an immediate response. In addition, the frame that requests an immediate response may include a management frame that requests an immediate response. In addition, the case in which a PPDU includes a frame that requests an immediate response may be the case in which at least one of the frames included in the PPDU requests an immediate response. The case in which a PPDU includes a frame that requests an immediate response from a station may be the case in which at least one of the frames included in the PPDU requests an immediate response from the station. In the case that the multi-link device performs transmission that does not expect a response frame in any one link, the multi-link device may be allowed not termination of transmission in another link before termination of the transmission in the any one link. Therefore, in the case that the multi-link device performs transmission that does not expect a response frame in any one link, the multi-link device may terminate transmission in another link after termination of the transmission in the any one link. In the case that the multi-link device performs transmission that does not expect a response frame in any one link and a frame transmitted in another link requests an immediate frame, the multi-link device may be allowed not to terminate transmission in the another link before termination of the transmission in the any one link. In this instance, the response frame may be an immediate response frame. Therefore, in the case that the multi-link device transmits only a plurality of PPDUs that do not include a frame that requests a response, or simultaneously transmits a single PPDU including a frame that requests a response and a PPDU that requests a response, the multi-link device may not simultaneously terminate the transmission of the plurality of PPDUs. In this instance, the multi-link device may transmit a plurality of PPDUs in a manner in which the transmission end time of the PPDU including only a frame that does not request a response is not later than the transmission end time of the PPDU including a frame that requests a response.

In the embodiment of FIG. 12, while performing transmission in any one link, the multi-link device may be incapable of performing reception in another link. A first station (STA1) and a second station (STA2) of the multi-link device may transmit first data (Data1) and second data (Data2), respectively. While the first station (STA1) transmits the first data (Data1) to a first AP (AP1), the second station (STA2) starts transmission of the second data (Data2). The second data (Data2) may not request an ACK. The second station (STA2) terminates transmission of the second data (Data 2) before the first station (STA1) is terminated. Therefore, the transmission of the second station (STA2) may not disturb the first station (STA1) when the first station (STA1) receives an ACK (Ack for Data1) for the first data.

In addition, the above-described embodiments may be applied to the case in which, while performing transmission in any one link, the multi-link device is incapable of performing reception in another link.

Figure 13:
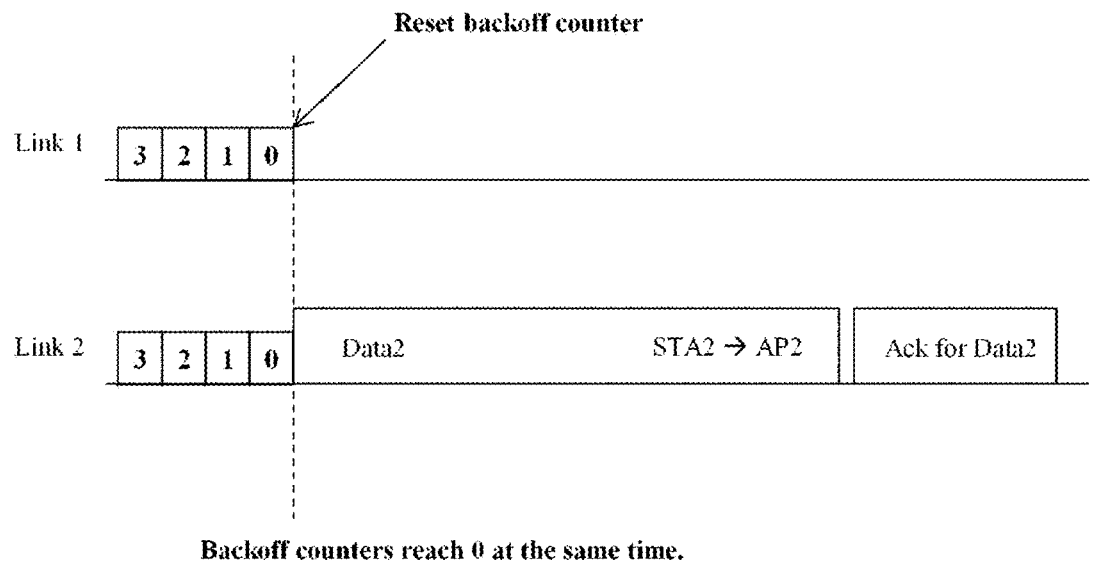
FIG. 13 is a diagram illustrating an operation of postponing, by a multi-link device, transmission in another link in the case that the multi-link device performs transmission in any one link according to an embodiment of the disclosure.

FIG. 13 is a diagram illustrating that, when performing transmission in any one link, a multi-link device postpones transmission in another link according to an embodiment of the disclosure.

The multi-link device may not perform simultaneous transmission in a plurality of links. Specifically, the multi-link device may perform transmission in only a single link among the plurality of links. For example, in the case that the multi-link device performs transmission in any one link and is incapable of receiving in another link, the multi-link device may be capable of performing transmission in only one link among the plurality of links. In such embodiments, the multi-link device may postpone transmission while performing channel access. The channel access described in the specification may refer to as channel access including a backoff procedure that has been described with reference to FIG. 6. Specifically, the multi-link device may postpone transmission in the remaining links excluding a single link in which transmission is to be performed. For example, the multi-link device may perform a backoff procedure in the plurality of links. In this instance, the multi-link device may perform transmission in a link of which the backoff counter reaches 0 first, and may reset the backoff counters in the remaining links. In addition, in the case that the backoff counters of the plurality of links reach 0, the multi-link device may perform transmission in any one of the plurality of links. In this instance, the multi-link device may randomly select any one of the plurality of links, and may perform transmission in the selected link. In addition, the multi-link device may reset the backoff counters of the links that are not selected. Resetting refers to setting, as a backoff counter, a value that the multi-link device randomly selects within a CW. In addition, the multi-link device may reset the CW of a link in which transmission is not performed. Specifically, the multi-link device may set the CW of the link in which transmission is not performed to CWmin that is the minimum value of the CW. Such embodiments may be applied to the case in which the multi-link device performs transmission in any one link and is incapable of performing reception in another link.

According to another detailed embodiment, based on whether the multi-link device performs transmission in any only link and is incapable of performing reception in another link, the multi-link device may determine a method of performing channel access in a plurality of links. Specifically, in the case that the multi-link device performs transmission in any one link and is incapable of performing reception in another link, the multi-link device may not independently perform channel access in the plurality of links. Specifically, in the case that the multi-link device performs transmission in any one link and is capable of performing reception in another link, the multi-link device may independently perform channel access in the plurality of links.

As described in FIGS. 11 to 12, the multi-link device may control the length of a PPDU to satisfy a constraint condition according to a simultaneous performance condition. In this instance, in the case that the multi-link device is difficult to finish controlling the length of a PPDU until a transmission time arrives, the multi-link device may perform transmission in any one of a plurality of links. In addition, in the case that a transmission time allowed in any one link is shorter than traffic that needs to be transmitted in the corresponding link, the multi-link device may postpone the transmission in the corresponding link. For example, according to the embodiments of FIGS. 11 and 12, a transmission time allowed in a link may be shorter than traffic that needs to be transmitted in the corresponding link.

The multi-link device in the embodiment of FIG. 13 may perform channel access including a backoff in a first link (Link 1) and a second link (Link 2), independently. The backoff counter of the first link (Link 1) and the backoff counter of the second link (Link 2) may simultaneously reach 0. In this instance, the multi-link device may perform transmission in only the second link (Link 2), and may reset the backoff counter of the first link (Link 1).

In the above-described embodiments, the multi-link device resets a backoff counter when postponing transmission. According to another detailed embodiment, when the multi-link device postpones transmission, the multi-link device may maintain the value of a backoff counter as it is. Through the above, the fairness of transmission between links may be guaranteed, which may deteriorate due to postponing transmission.

Figure 14:
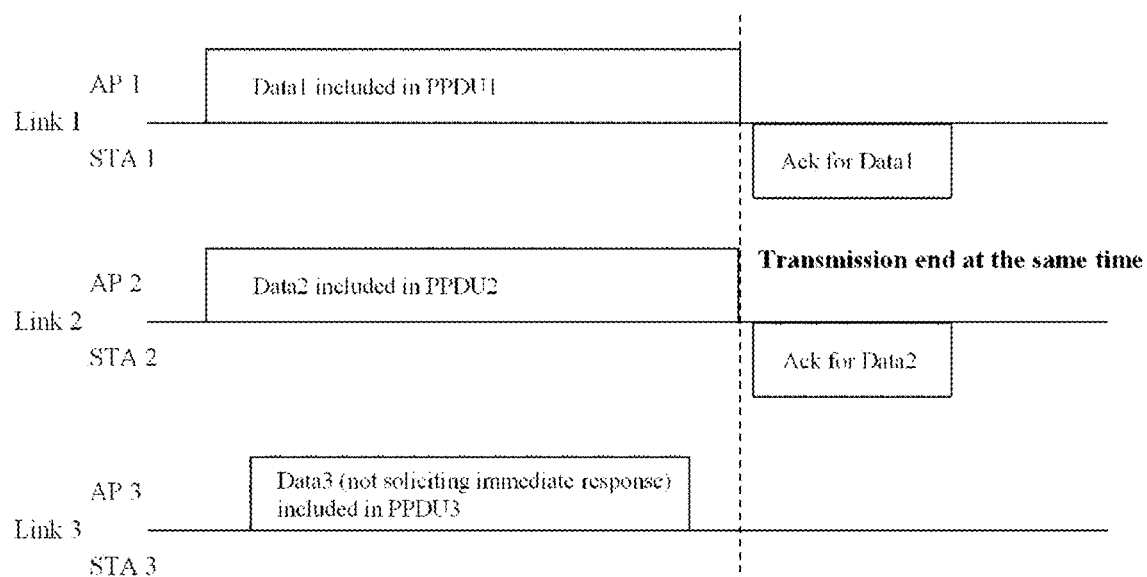
FIG. 14 is a diagram illustrating an operation of terminating, by a multi-link device, transmission in any one link first in the case that the multi-link device according to an embodiment of the disclosure performs transmission in a plurality of links.

FIG. 14 is a diagram illustrating an operation of terminating, by a multi-link device, transmission in any one link first when the multi-link device according to an embodiment of the disclosure performs transmission in a plurality of links.

In the case that the multi-link device performs transmission in a plurality of links as described in the embodiments with reference to FIG. 11, the multi-link device may simultaneously terminate transmission in the plurality of links. Specifically, the multi-link device may simultaneously terminate PPDU transmission in the plurality of links. Simultaneous termination of the transmission of a plurality of PPDUs may be referred to as aligning (align) the ends of the PPDUs. In addition, the difference in the transmission end time between the plurality of PPDUs is less than, or less than or equal to a threshold value, the ends of the plurality of PPDUs are regarded as being aligned. In this instance, the threshold value may be a predetermined value. Specifically, the threshold value may be a value set based on an SIFS. In addition, the threshold value may be a value set based on an SIFS and a signal extension length. For example, the threshold value may be a value obtained by dividing the sum of the SIFS and the signal extension length by 2. In this instance, the threshold value may be Bus.

In the case that the multi-link device transmits a plurality of PPDUs to another multi-link device in a plurality of links, the multi-link device may align the ends of the plurality of PPDUs. In the case that the multi-link device transmits a plurality of PPDUs to another multi-link device in a plurality of links, the multi-link device may align the ends of two or more PPDUs. In this instance, the multi-link device may be referred to as a transmitter multi-link device, and another multi-link device may be referred to as a receiver multi-link device. A transmitter multi-link device or a receiver multi-link device may be a multi-link device that does not support STR, or restrictively supports STR. The multi-link device that does not support STR or restrictively support STR may be referred to as a non-STR multi-link device. In addition, a multi-link device that supports STR may be referred to as an STR multi-link device.

A receiver multi-link device may be a non-STR multi-link device. In the case that a transmitter multi-link device transmits a plurality of PPDUs to a non-STR multi-link device in a plurality of links, the transmitter multi-link device may align the ends of the plurality of PPDUs. A non-AP multi-link device may be a non-STR multi-link device. Therefore, in the case that an AP multi-link device transmits a plurality of PPDUs to a non-STR non-AP multi-link device in a plurality of links, the AP multi-link device may align the ends of the plurality of PPDUs.

A transmitter multi-link device may be a non-STR multi-link device. In the case that a non-STR multi-link device transmits a plurality of PPDUs to a receiver multi-link device in a plurality of links, a transmitter multi-link device may align the ends of the plurality of PPDUs. Therefore, in the case that a non-STR non-AP multi-link device transmits a plurality of PPDUs to an AP multi-link device in a plurality of links, the non-STR non-AP multi-link device may align the ends of the PPDUs.

In such embodiments, the transmission direction heading from an AP or AP multi-link device to a non-AP STA or non-AP multi-link device may be referred to as a downlink (DL). In addition, the transmission direction heading from a non-AP STA or non-AP multi-link device to an AP or AP multi-link device may be referred to as an uplink (UL). A frame and a PPDU that an AP or an AP multi-link device transmits to a non-AP STA or a non-AP multi-link device may be referred to as a DL frame and a DL PPDU, respectively. A frame and a PPDU that a non-AP STA or non-AP multi-link device transmits to an AP or AP multi-link device may be referred to as a UL frame and a UL PPDU, respectively.

The above-described embodiment that aligns the ends of a plurality of PPDUs may be applied to only the case in which at least one of the plurality of PPDUs includes a frame that requests an immediate response.

In the above-described embodiments, a plurality of PPDUs may be transmitted to a single multi-link device in a plurality of links. Specifically, a receiver multi-link device may receive a plurality of PPDUs from a plurality of stations that belong to a single multi-link device in a plurality of links. For example, the receiver multi-link device may operate in a first link and a second link. A first station of the receiver multi-link device operates in a first link, and a second station of the receiver multi-link device operates in a second link. While a first PPDU is transmitted to the first station in the first link, a second PPDU is transmitted to the second station in the second link, and in the case that each of the first PPDU and the second PPDU includes a frame that requests an immediate response, the end of the first PPDU and the end of the second PPDU may be aligned.

In the above-described embodiments, the case in which a plurality of PPDUs are transmitted in a plurality of links may be simultaneous transmission of the plurality of PPDUs. In addition, the case in which a plurality of PPDUs are transmitted in a plurality of links may be simultaneous transmission at any point in time. The simultaneous transmission of the plurality of PPDUs may have the point in time at which the PPDUs are simultaneously transmitted although the transmission start time of the plurality of PPDUs are different from each other. The simultaneous transmission of the plurality of PPDUs may have the point in time at which the PPDUs are simultaneously transmitted although the transmission end time of the plurality of PPDUs are different from each other.

According to other detailed embodiments, in the case that at least one PPDU among a plurality of PPDUs transmitted in a plurality of links includes a frame having a high priority, a multi-link device may not align the ends of the plurality of PPDUs. In this instance, the frame having a high priority may be a frame having a higher priority than a predetermined priority. In addition, the frame having a high priority may be a predetermined frame. Through the above, the multi-link device may increase the efficiency of transmission of a frame having a high priority.

In the above-described embodiments, in the case that only some of the plurality of PPDUs satisfy a predetermined condition, the multi-link device may align the ends of the some PPDUs that satisfy the predetermined condition. In the case that the multi-link device transmits the plurality of PPDUs, the multi-link device may align the ends of a plurality of PPDUs including frames that request immediate responses among the plurality of PPDUs. For example, only two PPDUs among the plurality of PPDUs include frames that request immediate responses, the multi-link device may align the ends of only the two PPDUs including frames that request immediate responses among the plurality of PPDUs. In these embodiments, the multi-link device may not align the end of a PPDU that does not include a frame requesting an immediate response with the ends of a plurality of PPDUs including frames that request immediate responses. Specifically, the multi-link device may perform transmission in a manner in which the end of a PPDU that does not include a frame requesting an immediate response is not later than the end of a PPDU including a frame that requests an immediate response.

In the embodiment of FIG. 14, an AP multi-link device may include a first AP (AP1), a second AP (AP2), and a third AP (AP3). In addition, a non-AP multi-link device may include a first station (STA1), a second station (STA2), and a third station (STA3). An AP multi-link device or a non-AP multi-link device may be a non-STR multi-link device. Specifically, a non-AP multi-link device may be a non-STR multi-link device. The first AP (AP1), the second AP (AP2), and the third AP (AP3) may transmit a first PPDU (PPDU1), a second PPDU (PPDU2), and a third PPDU (PPDU3) to the first station (STA1), the second station (STA2), and the third station (STA3) via a first link (Link1), a second link (Link2), and a third link (Link3), respectively. The first PPDU (PPDU1) may include first data (Data1) that requests an immediate response, and the second PPDU (PPDU2) may include second data (Data2) that requests an immediate response. The third PPDU (PPDU3) may include only third data (Data3) that does not request an immediate response.

The AP multi-link device may align the end of the first PPDU (PPDU1) and the end of the second PPDU (PPDU2), and may not align the end of the third PPDU (PPDU3) with the ends of the first PPDU (PPDU1) and the second PPDU (PPDU2). In this instance, the end time of the third PPDU (PPDU3) may be at the same time of or earlier than the end time of the first PPDU (PPDU1) and the second PPDU (PPDU2).

Figure 15:
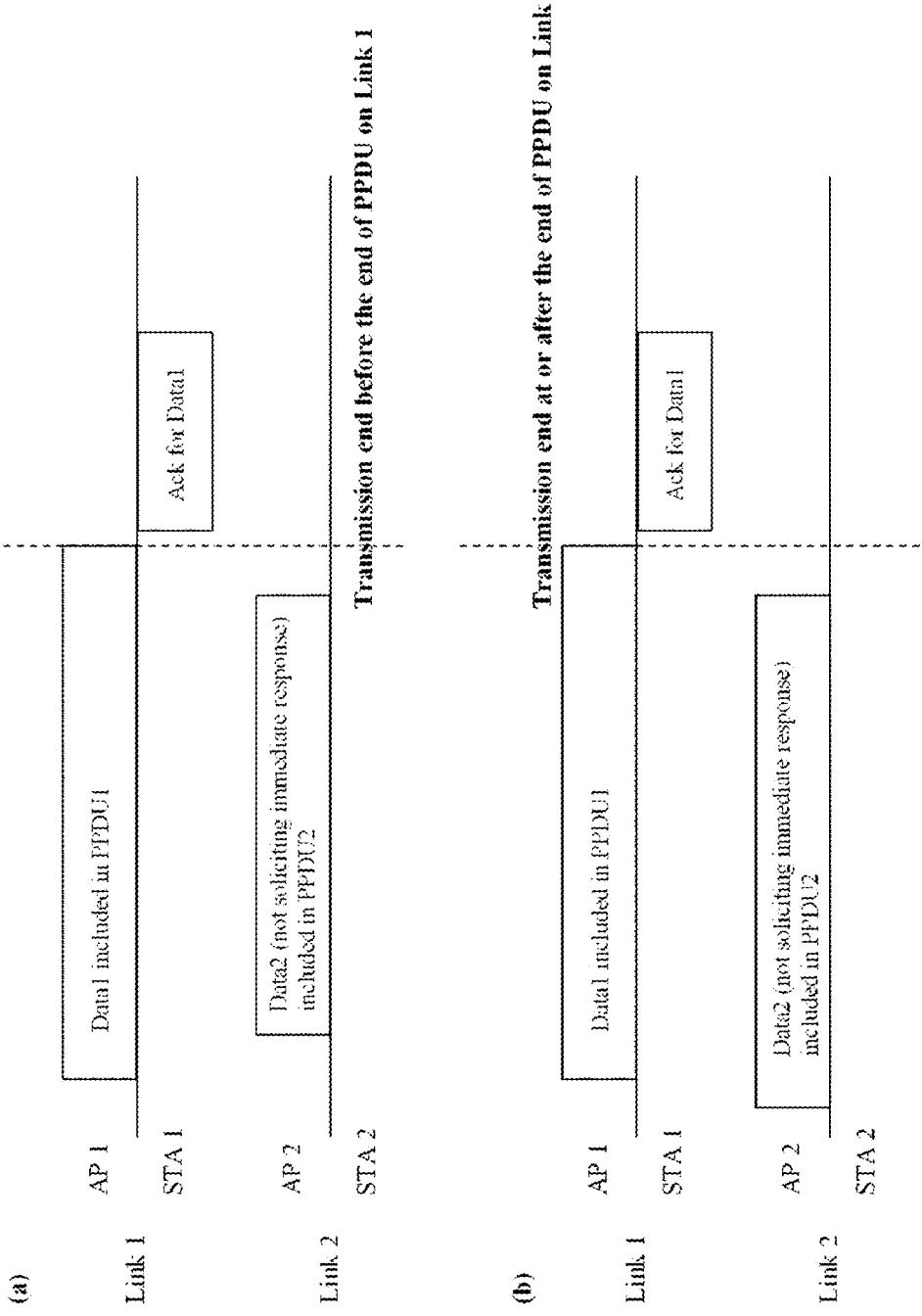
FIG. 15 is a diagram illustrating an operation of terminating, by a multi-link device, transmission in any one link first in the case that the multi-link device according to another embodiment of the disclosure performs transmission in a plurality of links.

FIG. 15 is a diagram illustrating an operation of terminating, by a multi-link device, transmission in any one link first in the case that the multi-link device according to another embodiment of the disclosure performs transmission in a plurality of links.

In the case that a transmitter multi-link device transmits a plurality of PPDUs to a receiver multi-link device in a plurality of links, the transmitter multi-link device may determine the transmission length of each of the plurality of PPDUs depending on whether each corresponding PPDU includes a frame that requests an immediate response. Specifically, the transmitter multi-link device may determine to enable the transmission end of a PPDU that does not include a frame requesting an immediate response to be performed at the same time of or earlier than the transmission end of a PPDU that includes a frame requesting an immediate response. Therefore, the transmitter multi-link device may determine to enable the transmission end of a PPDU that includes a frame requesting an immediate response to be performed at the same time of or later than the transmission end of a PPDU that does not include a frame requesting an immediate response. In the embodiment, the transmitter multi device or the receiver multi-link device may be a non-STR multi-link device.

In the embodiment of FIG. 15, an AP multi-link device may include a first AP (AP1) and a second AP (AP2). In addition, a non-AP multi-link device may include a first station (STA1) and a second station (STA2). The AP multi-link device or the non-AP multi-link device may be a non-STR multi-link device. Specifically, the non-AP multi-link device may be a non-STR multi-link device. The first AP (AP1) and the second AP (AP2) may transmit a first PPDU (PPDU1) and a second PPDU (PPDU2) to the first station (STA1) and the second station (STA2) via a first link (Link1) and a second link (Link2), respectively. The first PPDU (PPDU1) may include first data (Data1) that requests an immediate response, and the second PPDU (PPDU2) may include only second data (Data2) that does not request an immediate response. In this instance, the second data (Data2) may be an A-MPDU including only an MPDU that does not request an immediate response. In addition, a receiver of the first data (Data1) may be the first station (STA1), and a receiver of the second data (Data2) may be the second station (STA1). In addition, the first PPDU (PPDU1) and the second PPDU (PPDU2) may be one of an SU PPDU or an MU PPDU. The AP multi-link device may transmit the first PPDU (PPDU1) and the second PPDU (PPDU2) in a manner in which the transmission end time of the second PPDU (PPDU2) is the same as or earlier than the transmission end time of the first PPDU (PPDU1). The embodiments described with reference to FIG. 15 may be applied, irrespective of the transmission start time of a PPDU. Specifically, as illustrated in FIG. 15A, the transmission start of the first PPDU (PPDU1) may be earlier than the transmission start of the second PPDU (PPDU2). In addition, as illustrated in FIG. 15B, the transmission start of the first PPDU (PPDU1) may be later than the transmission start of the second PPDU (PPDU2).

Via the embodiments of FIGS. 10 to 15, a problem that may be caused by an internal leakage may be overcome.

A mapping between a link and a TID may be configured as illustrated in the embodiment described with reference to FIG. 9. In this instance, a detailed operation method of a multi-link device will be described with reference to FIGS. 16 to 20.

Figure 16:
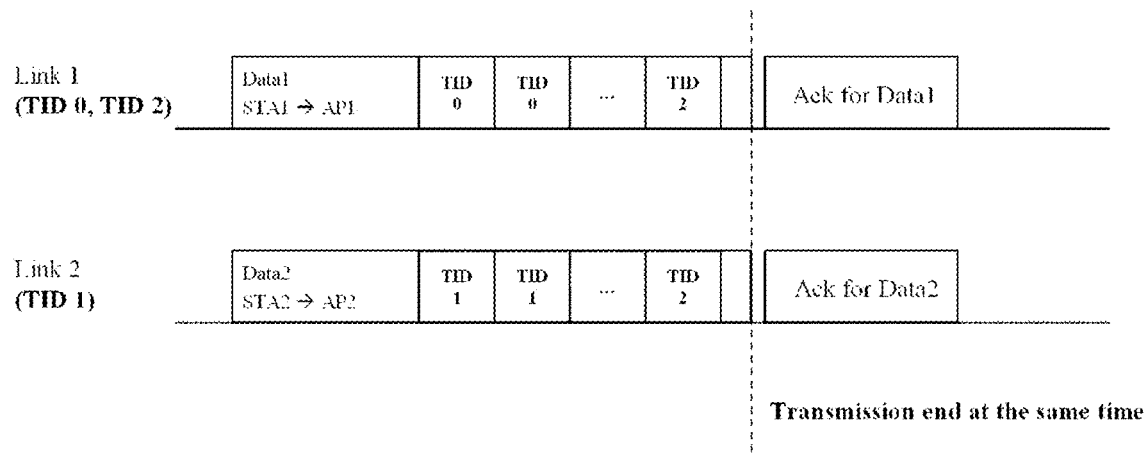
FIG. 16 is a diagram illustrating that a multi-link device operates using a mapping between a link and a TID according to an embodiment of the disclosure.

FIG. 16 is a diagram illustrating that a multi-link device operates using a mapping between a link and a TID according to an embodiment of the disclosure.

In an embodiment of the disclosure, although a mapping between a TID and a link exists, the multi-link device may transmit traffic without following the mapping between a TID and a link. Specifically, an MPDU corresponding to a TID that is not mapped to any one link may be transmitted via the corresponding link. For example, an aggregate-MPDU (A-MPDU) transmitted in any one link may be an aggregation of an 1MPDU corresponding to a TID mapped to the corresponding link and an 1MPDU corresponding to a TID that is not mapped to the corresponding link.

In addition, a PPDU transmitted in any one link may include an MPDU corresponding to a TID mapped to the corresponding link and an MPDU corresponding to a TID that is not mapped to the corresponding link. As described above, as an exceptional case of the mapping between a TID and a link.

Specifically, in the case that restriction on a transmission end time in any one link is applied, a frame corresponding to a TID that is not mapped to the corresponding link may be transmitted in the corresponding link. According to a detailed embodiment, in the case that the multi-link device performs, the multi-link device may set the transmission end time of the second link based on the transmission end time of the first link. In this instance, the multi-link device may transmit an MPDU corresponding to a TID mapped to the second link and an MPDU corresponding to a TID that is not mapped to the second link, together. In addition, the multi-link device may compare the value of a TID that is not mapped to the link and the value of a TID that is mapped to the link, and based on a comparison result, may determine whether to transmit the MPDU corresponding to the TID mapped to the second link and the 1MPDU corresponding to the TID that is not mapped to the second link together. For example, in the case that the value of the TID that is not mapped to the link is greater than the value of the TID that is mapped to the link, the multi-link device may transmit the 1MPDU corresponding to the TID mapped to the 5 link and the MPDU corresponding to the TID that is not mapped to the second link together. According to another detailed embodiment, in the case that the value of the TID that is not mapped to the link is less than the value of the TID that is mapped to the link, the multi-link device may transmit the 1MPDU corresponding to the TID mapped to the link and the 1MPDU corresponding to the TID that is not mapped to the second link together.

According to another detailed embodiment, the multi-link device may compare a priority corresponding to a TID that is not mapped to a link and a priority corresponding to a TID that is mapped to the link, and based on a comparison result, may determine whether to transmit an MPDU corresponding to the TID mapped to the link and an MPDU corresponding to the TID that is not mapped to the link together in the corresponding link. In this instance, the priority may be a traffic class (TC) or an access category (AC).

An AP multi-link device may include a first AP (AP1) and a second AP (AP2). In addition, a non-AP multi-link device may include a first station (STA1) and a second station (STA2). A first TID (TID 0) and a third TID (TID 2) may be mapped to the first link (Link 1), and a second TID (TID 1) may be mapped to the second link (Link 2). The non-AP multi-link device may transmit an MPDU corresponding to a third TID (TID 2) that is not mapped to the second link (Link 2) in the second link (Link 2). Specifically, the non-AP multi-link device may transmit a PPDU that includes an MPDU mapped to the first TID (TID 0) mapped to the second link (Link 2) and an MPDU corresponding to the third TID (TID 2) that is not mapped to the second link (Link 2), in the second link (link 2). In this instance, the non-AP multi-link device satisfies a predetermined condition, and thus may transmit, in the second link (Link 2), the MPDU corresponding to the third TID (TID 2) that is not mapped to the second link (Link 2). Specifically, since the value of the third TID (TID2) is greater than the value of the second TID (TID0, the non-AP multi-link device may transmit, in the second link (Link 2), the MPDU corresponding to the third TID (TID 2) that is not mapped to the second link (Link 2). In addition, in the case that the non-AP multi-link device aligns the end of transmission in the first link and the end of transmission in the second link, traffic that needs to be transmitted in the second link (Link 2) is insufficient and thus, the non-AP multi-link device may transmit, in the second link (Link 2), the MPDU corresponding to the third TID (TID2) that is not mapped to the second link (Link 2).

In the case that the multi-link device selects a link to be used for transmission among a plurality of links, the multi-link device may transmit, in the selected link, a frame corresponding to a TID that is not mapped to the selected link. Specifically, in the case that the multi-link device selects a link to be used for transmission among a plurality of links, the multi-link device may transmit, in the selected link, a frame corresponding to a TID that is mapped to a link that is not selected among the plurality of links. Specifically, the embodiment may be applied to the embodiment described with reference to FIG. 13.

In these embodiments, a problem that needs to be solved may be determining a link in which a multi-link device is to transmit a response to a frame corresponding to a TID that is not mapped to the link. In a link in which the frame corresponding to the TID that is not mapped to the link is transmitted, the multi-link device may transmit a response to the corresponding frame. In this instance, the response to the corresponding frame may be an ACK. For example, the AP multi-link device in the embodiment of FIG. 16 may transmit an ACK in association with a frame corresponding to the first TID (TID 0) in the first link (Link 1), and may transmit an ACK in association with a frame corresponding to the third TID (TID 2) transmitted in the first link (Link 1). For example, the AP multi-link device may transmit an ACK in association with a frame corresponding to the second TID (TID 1) in the second link (Link 2), and may transmit an ACK in association with a frame corresponding to the third TID (TID 2) transmitted in the second link (Link 2). In these embodiments, the multi-link device transmits a response to a frame in a link in which the frame is received, and thus the complexity of implementation may be low.

According to another detailed embodiment, the multi-link device may transmit a response to a corresponding frame in a link to which a corresponding TID is mapped, as opposed to a link in which the frame corresponding to the TID that is not mapped to the link is transmitted. In this instance, the response to the corresponding frame may be an ACK. For example, the AP multi-link device in the embodiment of FIG. 16 may transmit, in the first link (Link 1), an ACK in association with a frame corresponding to the first TID (TID 0) and an ACK in association with a frame corresponding to the third TID (TID 2). In addition, the AP multi-link device may transmit an ACK in association with a frame corresponding to the second TID (TID 1) in the second link (Link 2). In these embodiments, the multi-link device may transmit a response to a frame corresponding to a TID via a link that is not mapped to the corresponding TID and thus, may reduce the burden of processing that collects responses transmitted in a plurality of links.

Exceptional situations in which transmission is performed irrespective of a mapping between a link and a TID have been described with reference to FIG. 16. Exceptional situations in which transmission is performed irrespective of a mapping between a link and a TID will be described again according to other detailed embodiments with reference to FIGS. 17 and 18.

Figure 17:
FIG. 17 is a diagram illustrating an operation of performing UL MU transmission by a station according to an embodiment of the disclosure.
Figure 17:
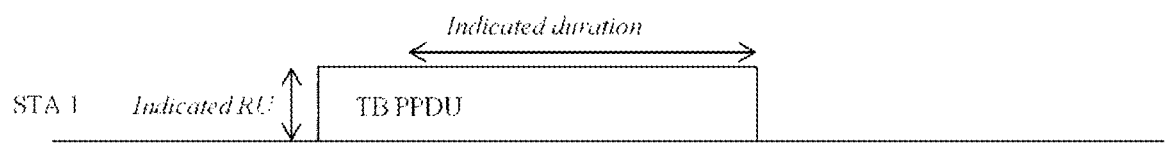
Figure 17:
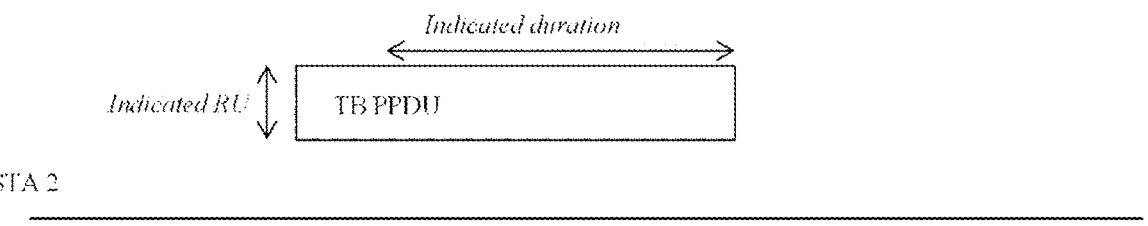
Figures 18, 19:
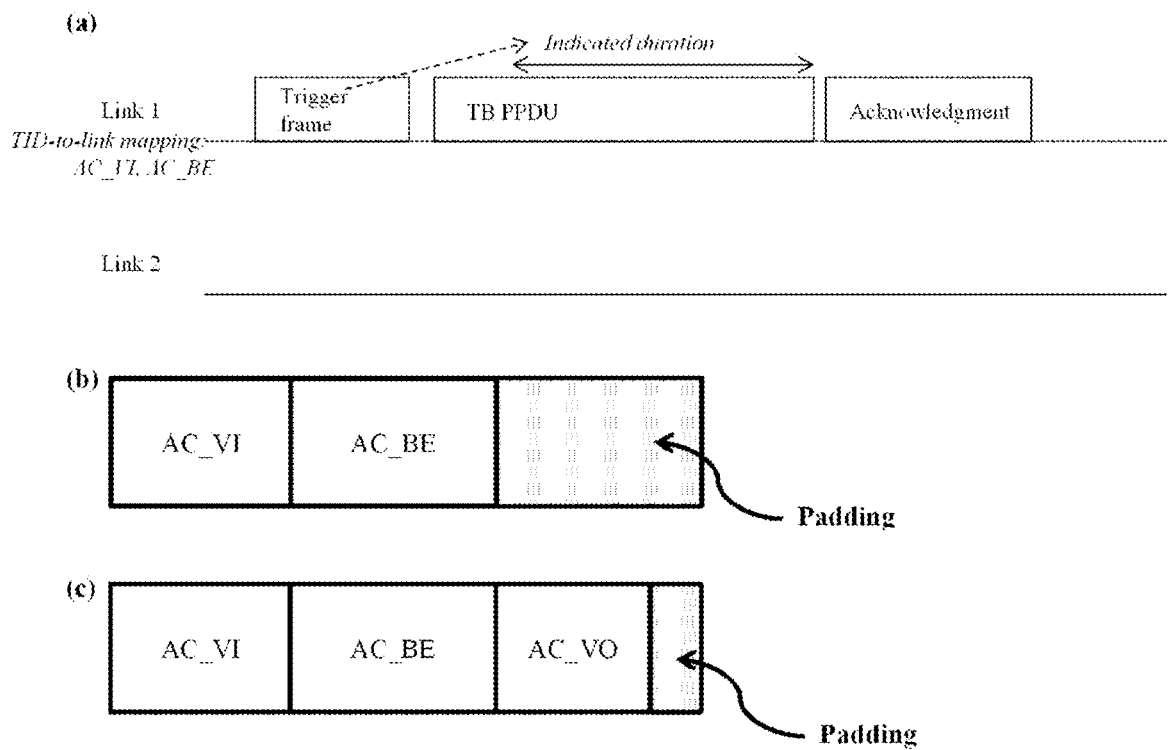
FIG. 18 is a diagram illustrating that a multi-link device performs multi-TID aggregation according to an embodiment of the disclosure.
FIG. 19 is a diagram illustrating an element that signals information associated with a mapping between a link and a TID according to an embodiment of the disclosure.

FIG. 17 is a diagram illustrating an operation of performing UL MU transmission by a station according to an embodiment of the disclosure. FIG. 18 is a diagram illustrating that a multi-link device performs multi-TID aggregation according to an embodiment of the disclosure.

As described above, in the case that restriction on a transmission end time is applied, the multi-link device may compare a priority corresponding to a TID that is not mapped to a link and a priority corresponding to a TID that is mapped to the link. In this instance, the multi-link device may determine, based on a comparison result, whether to transmit an MPDU corresponding to the TID that is not mapped to the link in the corresponding link. Specifically, in the case that the priority of the 1MPDU corresponding to the TID mapped to the link is higher than the priority of the MPDU corresponding to the TID that is not mapped to the link, the multi-link device may transmit the 1MPDU corresponding to the TID that is not mapped to the link in the corresponding link. For example, in the case that the priority of the MPDU corresponding to the TID that is not mapped to the link has the highest priority, the multi-link device may transmit the MPDU corresponding to the TID that is not mapped to the link in the corresponding link.

According to another detailed embodiment, in the case that the priority of an MPDU corresponding to a TID that is not mapped to a link is lower than the priority of an 1MPDU corresponding to a TID mapped to the link, the multi-link device may transmit the 1MPDU corresponding to the TID that is not mapped to the link in the corresponding link. For example, in the case that the priority of the MPDU corresponding to the TID that is not mapped to the link has the lowest priority, the multi-link device may transmit the MPDU corresponding to the TID that is not mapped to the link in the corresponding link. Through the above, the multi-link device may have an opportunity to transmit traffic that has low priority and rarely has a chance for transmission.

The case in which the multi-link device transmits, in the corresponding link, the MPDU corresponding to the TID that is not mapped to the link, may be allowed only when the MPDU corresponding to the TID that is mapped to the link and the MPDU corresponding to the TID that is not mapped to the link are transmitted together. Specifically, transmission of the 1MPDU corresponding to the TID mapped to the link and the 1MPDU corresponding to the TID that is not mapped to the link together may be performed as follows. An aggregate-MPDU (A-MPDU) transmitted in any one link may be an aggregation of an 1MPDU corresponding to a TID mapped to the corresponding link and an MPDU corresponding to a TID that is not mapped to the corresponding link. In addition, a PPDU transmitted in any one link may include an 1MPDU corresponding to a TID mapped to the corresponding link and an 1MPDU corresponding to a TID that is not mapped to the corresponding link. Theses embodiments may be applied to an UL MU transmission operation.

First, the UL MU transmission operation will be described with reference to FIG. 17.

A plurality of stations may simultaneously transmit PPDUs. Such transmission or a series of processes for transmission is referred to as an uplink (UL) multi-user (MU) operation or UL MU transmission. An operation of triggering transmission by a plurality of stations may be performed in advance, for UL MU transmission.

In addition, in the case that the plurality of stations simultaneously transmit a single PPDU, the plurality of stations may use a trigger-based (TB) PPDU. The TB PPDU may include an HE TB PPDU and an EHT TB PPDU, which have been described in advance. In addition, the TB PPDU may be a PPDU that supports simultaneous transmission by the plurality of stations. The plurality of stations may receive a frame that triggers UL MU transmission, and may perform UL MU transmission based on the frame received. An AP may transmit a frame that triggers UL MU transmission to a plurality of stations. In addition, the frame that triggers UL MU transmission may indicate a resource unit (RU) in which UL MU transmission is to be performed and which is allocated to each of a plurality of stations in the UL MU transmission performed. A station may transmit a TB PPDU via an RU allocated to the station. In addition, a frame that triggers UL MU transmission may be a trigger frame or a frame including trigger information. The frame including the trigger information may include trigger information in an MAC header. Specifically, the frame including the trigger information may include trigger information in an A-Control field. Specifically, the trigger information may be a triggered response scheduling (TRS) control field. In addition, UL MU transmission may be transmitted via the above-described TB PPDU. In addition, the plurality of stations may perform UL MU transmission as immediate responses. That is, the interval between a PPDU including a frame that triggers UL MU transmission and a PPDU including UL MU transmission may be an SIFS.

The frame that triggers the UL MU transmission may include information associated with the length of the PPDU including UL MU transmission. For ease of description, the information associated with the length of the PPDU including UL MU transmission may be referred to as response length information. The response length information may be the length of the PPDU including UL MU transmission. Based on the response length information included in the frame that triggers UL MU transmission, a station may determine the length of the PPDU including UL MU transmission. Specifically, the response length information may indicate the value of a length field of an L-SIG field of the PPDU including UL MU transmission. For example, based on the length field of the trigger frame, the station may determine the value of the length field of the L-SIG field of a TB PPDU. In addition, although the station does not have traffic that is enough to produce a PPDU corresponding to the response length information, the station may determine the length of a TB PPDU according to the response length information. Specifically, the station may insert a padding to the TB PPDU. For example, in the case that the station has an empty bit of a TB PPDU even after inserting all the traffic of the buffer to the TB PPDU, the station may insert a padding to the empty bit. Through the above, the station may satisfy the length of the TB PPDU indicated by the response length information. In addition, the response length information may indicate the number of OFMD symbols included in the TB PPDU. Therefore, when the station performs UL MU transmission, the station may perform transmission according to a length indicated by the frame that triggers the UL MU transmission. In addition, all the stations that perform UL MU transmission may transmit TB PPDUs having the same length. In addition, a response to the UL MU transmission may be an immediate response to the UL MU transmission. Therefore, the interval between the UL MU transmission and a response to the UL MU transmission may be an SIFS.

Referring to FIG. 17, an AP transmits a trigger frame to a first station (STA 1) and a second station (STA2). Each of the first station (STA 1) and the second station (STA 2) may transmit a TB PPDU via an RU of which allocation to each of the first station (STA 1) and the second station (STA 2) is indicated by the trigger frame. In this instance, the length of the TB PPDU transmitted by each of the first station (STA 1) and the second station (STA 2) may be determined based on the response length information indicated by the trigger frame. The lengths of the TB PPDUs transmitted by the first station (STA 1) and the second station (STA 2) are equal. In addition, the first station (STA 1) and the second station (STA 2) may transmit TB PPDUs as immediate responses to the trigger frames. The AP may transmit an ACK in association with a frame included in a TB PPDU that each of the first station (STA 1) and the second station (STA 2) transmits. As described above, even in the case that the station transmits a TB PPDU, restriction on a transmission end time may be applied. In this instance, embodiments related to the exceptional embodiments associated with a mapping between a link and a TID may be applied.

This will be further described in detail with reference to FIG. 18.

In the case that station performs UL MU transmission, the station may transmit a frame corresponding to a TID that is not mapped to a link in which the UL MU transmission is performed. Specifically, in the case that the station performs UL MU transmission, the station may transmit a frame that is mapped to the link in which the UL MU transmission is performed and the frame corresponding to the TID that is not mapped to the corresponding link, together. In FIG. 18, the station transmits a TB PPDU via first link (Link 1). In this instance, uplink of the first link (Link 1) may be mapped to AC_VI and AC_BE. In this instance, as illustrated in FIG. 18(b), the station may transmit a TB PPDU including a PDSU or a data frame corresponding to AC_VI and AC_BE and a padding. In this instance, in these embodiments, in the case that the length of a padding is significantly long, the transmission efficiency may deteriorate. In addition, the station that transmits the trigger frame, for example, an AP, is incapable of accurately recognizing traffic stored in the buffer of each of the plurality of stations that performs UL MU transmission and thus, the length of a padding included in the TB PPDU has the possibility of being increased. Therefore, the station may additionally include another AC that is not mapped to the first link (Link 1), that is, a PSDU or a data frame corresponding to AC_VO, in the TB PPDU as illustrated in FIG. 18(c). As described above, the priority of a TID mapped to a station link and the priority of a TID that is not mapped to the link may be compared, and based on a comparison result, whether to transmit a frame corresponding to the TID that is not mapped to the link in the corresponding link may be determined. For example, in FIG. 18(c), the AC_VO may have a priority higher than that of AC_VI or AC_BE 5 that is the AC mapped to the first link (Link 1). In addition, the station as described above may not transmit a PPDU including only a frame corresponding to a TID that is not mapped to the link, but may transmit a frame corresponding to a TID mapped to the link and the frame corresponding to the TID that is not mapped to the link together. Although FIG. 18 illustrates an embodiment of the disclosure with reference to an AC, the above-described embodiments may also be applied to the case in which a TID or TSID, instead of an AC, is mapped to a link.

In addition, the above-described embodiments may be applied together with a multi-TID aggregation rule. The multi-TID aggregation rule may determine a rule that MPDUs corresponding to different TIDs should be aggregated in a single A-MPDU. Therefore, an MPDU that is aggregated according to the multi-TID aggregation rule may not follow a mapping between a link and a TID. Specifically, in the case that a station aggregates an MPDU according to the multi-TID aggregation rule, the station may transmit an MPDU corresponding to a TID that is not mapped to a link in the corresponding link. The multi-TID aggregation rule may be as follows.
1) The TXOP limit of a transmission sequence according to which multi-TID aggregation is performed is greater than or equal to 0.
2) At least one of an 1MPDU or a frame of a main AC or an AC used for obtaining a TXOP is included in an aggregated A-MPDU.
3) A TID corresponding to an MPDU or a frame aggregated in an A-MPDU is a main AC or a TID having a priority higher than the main AC.
4) The length of A-MPDU does not exceed a TXOP that a main AC obtains.
5) The number of TIDs of MPDUs or frames aggregated in an A-MPDU does not exceed the number of TIDs indicated by Multi-TID Aggregation Rx Support.

In another detailed embodiment, the condition 3) for the described multi-TID aggregation rule may be replaced with the following condition 3-1).
3) A TID corresponding to an MPDU or a frame aggregated in an A-MPDU is a main AC or a TID having a priority lower than the main AC.

In another detailed embodiment, the station may transmit, based on a PPDU format, a TID that is not mapped to a link in the corresponding link. Specifically, in the case that the station transmits a DL MU PPDU, the station may transmit a frame corresponding to a TID that is not mapped to the link in the corresponding link. In this instance, the DL MU PPDU may be a DL HE MU PPDU or an EHT PPDU transmitted to a plurality of users. In addition, the station may transmit any frame corresponding to any TID that is not mapped to the link in the corresponding link.

Specifically, in the case that the station transmits a TB PPDU, the station may transmit a frame corresponding to a TID that is not mapped to the link in the corresponding link. In this instance, the TB PPDU may be an HE TB PPDU or an EHT TB PPDU. In a detailed embodiment, in the case that a Preferred AC sub-field of a trigger frame indicates a predetermined AC and a TID that is not even mapped to the link has a priority higher than or equal to the priority of the predetermined AC, the station may transmit a frame corresponding to the corresponding TID using a TB PPDU. In another detailed embodiment, in the case that a Preferred AC sub-field of a trigger frame indicates a predetermined AC and a TID that is not even mapped to the link has a priority lower than the priority of the predetermined AC, the station may transmit a frame corresponding to the corresponding TID using a TB PPDU.

The case to which the embodiment is applied may be the case in which a frame corresponding to a priority higher than the priority of a predetermined AC does not exist in a transmission buffer. In addition, as described above, within the scope in which the length of a TB PPDU is allowed, the station may transmit, using a TB PPDU, a frame corresponding to a TID although the TID is not mapped to the link. In this instance, the number of TIDs of frames aggregated in an A-MPDU may be limited. Specifically, a TID Aggregation Limit sub-field included in a trigger frame may indicate the maximum number of TIDs aggregated in the A-MPDU.

FIG. 19 is a diagram illustrating an element that signals information associated with a mapping between a link and a TID according to an embodiment of the disclosure.

A station may perform signaling associated with whether embodiments that have been described with reference to FIGS. 16 to 18 are supported or allowed. Receiving a frame corresponding to a TID, besides a TID mapped to a link, may require the station to perform an additional operation. Specifically, in the case that restriction on a transmission end time is applied, the station may perform signaling associated with whether frame transmission that does not follow a mapping between a link and a TID is supported or allowed. In the case that the information indicating whether frame transmission that does not follow the mapping between a link and a TID is supported or allowed indicates a first predetermined value, the corresponding information may indicate that the station supports or allows frame transmission that does not follow the mapping between a link and a TID. Specifically, in the case that the information indicating whether frame transmission that does not follow the mapping between a link and a TID is supported or allowed indicates the first predetermined value, the corresponding information may indicate that the station supports or allows frame transmission that does not follow the mapping between a link and a TID if restriction on a transmission end time is applied.

In the case that the information indicating whether frame transmission that does not follow the mapping between a link and a TID is supported or allowed indicates a second predetermined value, the corresponding information may indicate that the station does not support or allow frame transmission that does not follow the mapping between a link and a TID. Specifically, in the case that the information indicating whether frame transmission that does not follow the mapping between a link and a TID 15 supported or allowed indicates the second predetermined value, the corresponding information may indicate that the station does not support or allow frame transmission that does not follow the mapping between a link and a TID if restriction on a transmission end time is applied.

In addition, the information indicating whether frame transmission that does not follow the mapping between a link and a TID is supported or allowed may indicate whether the station supports or allows transmission according to restriction on a transmission end time. In this instance, allowing indicates whether corresponding transmission is capable of being received.

In addition, the station may perform signaling of the maximum number of TIDs that the station is capable of aggregating in a single A-MPDU. In this instance, the maximum number of TIDs that a single A-MPDU is capable of aggregating may be greater than or equal to the maximum number indicated by a TID aggregation limit field of a trigger frame. Specifically, the station may perform signaling of the maximum number of TIDs that the station is capable of additionally aggregating, excluding the TID mapped to the link. In another detailed embodiment, the station may perform signaling of the maximum number of TIDs that the station is capable of aggregating including the TID mapped to the link. In the above-described embodiments, signaling may be the maximum number of TIDs that the station is capable of aggregating if restriction on a transmission end time is applied. In addition, the station may perform signaling of the maximum number of TIDs that the station is capable of receiving.

In the above-described embodiments, a Capabilities element or an Operation element may be used for signaling. The station may perform signaling of whether the station supports or allows frame transmission that does not follow the mapping between a link and a TID, using the Capabilities element or the Operation element. In addition, the station may perform signaling of the maximum number of TIDs that the station is capable of aggregating using the Capabilities element or the Operation element. The Capabilities element may include an EHT Capabilities element. The operation element may include an EHT Operation element.

FIG. 19(a) illustrates a Capabilities element according to an embodiment of the disclosure, and FIG. 19(b) illustrates an Operation element according to another embodiment of the disclosure. The Multi-link multi-TID aggregation support sub-field of the Capabilities element may perform, with respect to an AP, signaling of whether a non-AP station supports frame transmission that does not follow a mapping between a link and a TID. A Number of TIDs sub-field of the Capabilities element indicates the maximum number of TIDs that the station is capable of aggregating. A Permission of Multi-link multi-TID aggregation sub-field of the Operation element may indicate, to a non-AP station, whether an AP allows frame transmission that does not follow the mapping between a link and a TID. In addition, the Number of TIDs sub-field of the Capabilities element indicate the maximum number of TIDs that the AP is capable of receiving.

The signaling associated with supporting and the signaling associated with permission may be included in the same type of element. In addition, the signaling indicating whether frame transmission that does not follow the mapping between a link and a TID is supported and the signaling indicating whether frame transmission that does not follow the mapping between a link and a TID is allowed may be included in the same type of subfield of the same type of element. In this instance, information indicating the subfield of an element may differ depending on the role of a station that transmits the element. Specifically, depending on whether an element is transmitted by a non-AP station or an AP, the information indicating the subfield of the element may differ. For example, in the case that the non-AP station transmits the corresponding element, the subfield of the corresponding element may indicate whether frame transmission that does not follow the mapping between a link and a TID is supported. In addition, in the case that the AP transmits the corresponding element, the subfield of the corresponding element may indicate whether frame transmission that does not follow the mapping between a link and a TID is allowed.

In the case that restriction on a transmission end time is applied, whether frame transmission that does not follow the mapping between a link and a TID is allowed may be determined for each PPDU format. In the case that the information indicating whether frame transmission that does not follow the mapping between a link and a TID is allowed is included in a frame or a PPDU, the corresponding information may be applied to a response to the corresponding frame or PPDU. In the case that the information indicating whether frame transmission that does not follow the mapping between a link and a TID is allowed is included in a frame or a PPDU, the corresponding information may be applied in a transmit opportunity (TXOP) in which the corresponding frame or PPDU is included. The maximum number of TIDs that the station is capable of aggregating may be determined for each PPDU format. In the case that the information indicating the maximum number of TIDs that the station is capable of aggregating is included in a frame or a PPDU, the corresponding information may be applied to a response to the corresponding frame or PPDU. In the case that the information indicating the maximum number of TIDs that the station is capable of aggregating is included in a frame or a PPDU, the corresponding information may be applied to a response to the corresponding frame or PPDU. In the case that the information indicating the maximum number of TIDs that the station is capable of aggregating is included in a frame or a PPDU, the corresponding information may be applied to in a TXOP in which the corresponding frame or PPDU is included.

Particularly, a frame that triggers UL MU transmission may include the information indicating whether frame transmission that does not follow the mapping between a link and a TID 15 allowed. In the case that the station transmits a response to the frame that triggers UL MU transmission, the station may determine, based on the information indicating whether frame transmission that does not follow the mapping between a link and a TID is allowed, whether to transmit a frame corresponding to a TID that is not mapped to a link. In a detailed embodiment, the information indicating whether frame transmission that does not follow the mapping between a link and a TID is allowed may be included in a Common Info field of the trigger frame. For example, the information indicating whether frame transmission that does not follow the mapping between a link and a TID is allowed may be included in a 64th bit of the Common Info field, that is, B63.

In another detailed embodiment, the information indicating whether frame transmission that does not follow the mapping between a link and a TID is allowed may be included in a subsequent bit of a reserved sub-field of UL HE-SIG-A2. In another detailed embodiment, the information indicating whether frame transmission that does not follow the mapping between a link and a TID is allowed may be included in a bit ahead of a Trigger Dependent Common Info field. In another detailed embodiment, the information indicating whether frame transmission that does not follow the mapping between a link and a TID is allowed may be included in a User Info field of the trigger frame. In addition, embodiments applied to the information indicating whether frame transmission that does not follow the mapping between a link and a TID is allowed may also be applied to the information indicating the maximum number of TIDs that the station is capable of aggregating. The above-described Common Info field may include information that applied in common to a TB PPDU or all stations that respond to the trigger frame. The User Info field may include information applied to a transmitted TB PPDU or a station that provides a response in an RU indicated by the User Info field.

Figure 21:
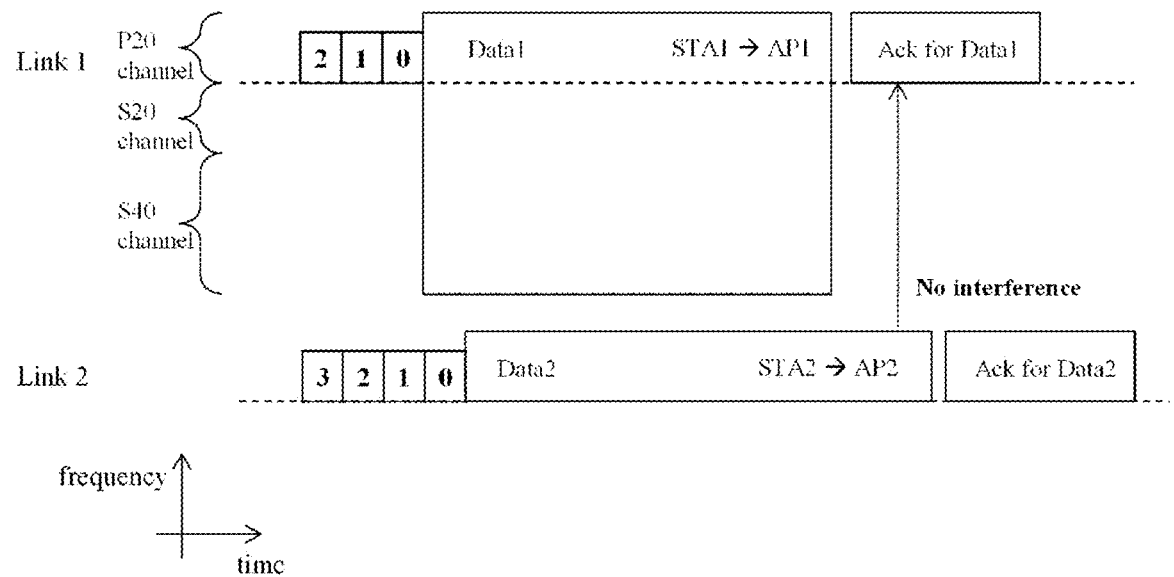
FIG. 21 is a diagram illustrating an operation of performing transmission in a plurality of links, by a multi-link device according to an embodiment of the disclosure.

FIG. 21 is a diagram illustrating that a station performs channel access in order to transmit a trigger frame according to an embodiment of the disclosure.

In the case of transmission of a frame that triggers UL MU transmission, a station may perform channel access which has been described with reference to FIG. 6. In this instance, an AIFS may be determined based on the AC, TID, or priority of traffic that the station is to transmit. Specifically, the AIFS may be a value obtained by adding an SIFS to the product of an AIFSN and a slot time. In the case that the station desires to transmit traffic having a relatively high priority, the length of the AIFS may be relatively short. In addition, in the case that the station desires to transmit traffic having a relatively low priority, the length of the AIFS may be relatively long. In the case that the station performs channel access in order to transmit a trigger frame, it may matter how to determine the AC, TID, or priority that the station is to apply.

In the case that the station performs channel access to transmit a trigger frame, the station may perform channel access based on an AC, TID, or priority corresponding to a frame transmitted in response to the trigger frame and a mapping between a link and a TID. Specifically, in the case that the station performs channel access to transmit a trigger frame, the station may perform channel access based on an AC corresponding to a frame transmitted in response to the trigger frame and the mapping between a link and a TID. In this instance, the mapping between a link and a TID may be configured between a transmitter of the trigger frame and a receiver of the trigger frame. In a detailed embodiment, the mapping between a link and a TID may be the mapping between a TID and a link in a direction from the receiver of the trigger frame to the transmitter of the trigger frame. In the case that the station performs channel access in order to transmit a trigger frame, the station may apply an AC or a TID defined in the mapping between a TID and a link in a direction from the receiver of the trigger frame to the transmitter of the trigger frame. In the case that the station performs channel access in order to transmit a trigger frame, the station may not apply an AC or a TID that is not defined in the mapping between a TID and a link in a direction from the receiver of the trigger frame to the transmitter of the trigger frame. In the case that the station performs channel access in order to transmit a trigger frame, the station may apply a TID or an AC determined based on a TID or an AC defined in the mapping between a TID and a link in a direction from the receiver of the trigger frame to the transmitter of the trigger frame. In addition, if a plurality of receivers receive a trigger frame, the mapping between a link and a TID may be the mapping between a TID and a link in a direction from the plurality of receivers to a transmitter. These embodiments may be applied to the case in which a PPDU including only a frame that triggers UL MU transmission includes only a frame that triggers UL MU transmission. In addition, these embodiments may be applied only to the case in which a PPDU including a frame that triggers UL MU transmission does not include a QoS data frame.

In addition, the above-described embodiments may be applied to the case in which every receiver of a PPDU including a frame that triggers UL MU transmission is a multi-link device. Therefore, the above-described embodiments may be applied to the case in which every receiver of a PPDU including a trigger frame is a station included in a multi-link device. In the case that the receivers of a PPDU including a trigger frame include a station that is not included in a multi-link device, the station may use any AC.

In addition, in the case that a frame that triggers UL MU transmission does not designate a station and triggers random access, the station may perform channel access irrespective of the mapping between a link and a TID.

Figure 20:
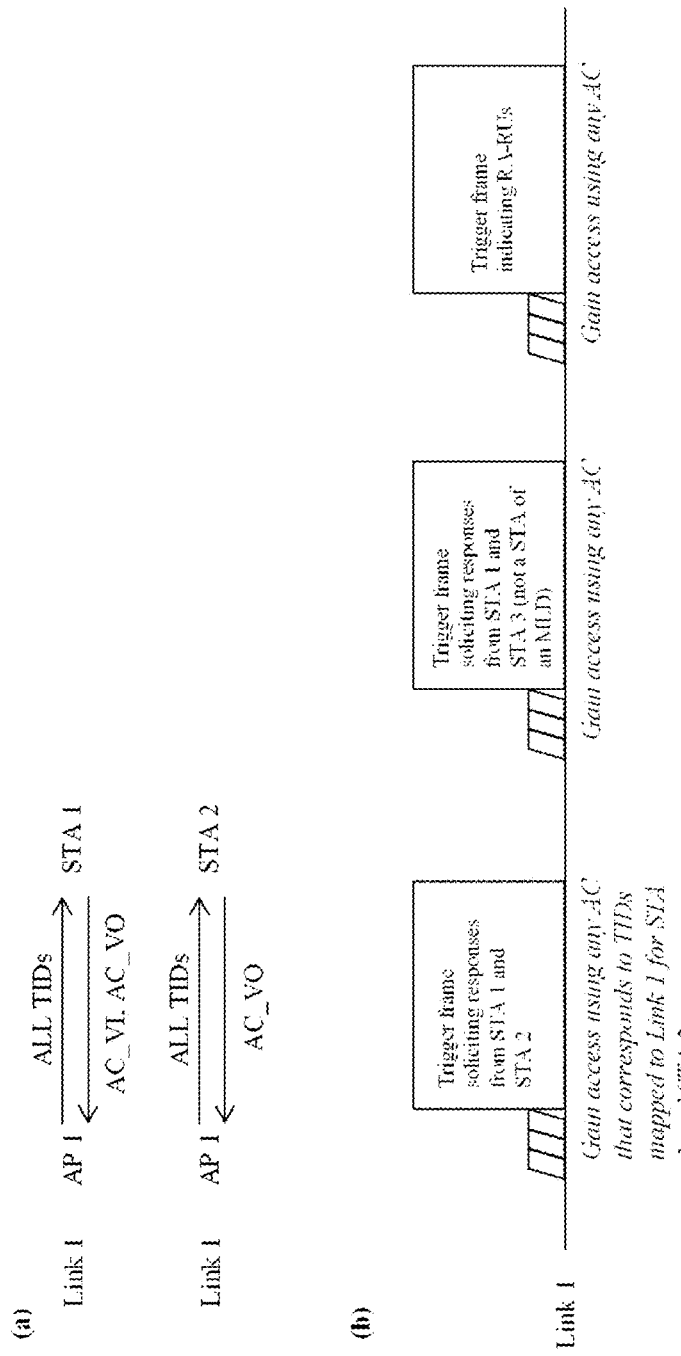
FIG. 20 is a diagram illustrating that a station performs channel access in order to transmit a trigger frame according to an embodiment of the disclosure.

In FIG. 20, an AP multi-link device includes a first AP (AP 1). In addition, a first non-AP multi-link device (Non-AP MLD 1) includes a first station (STA 1). In addition, a second non-AP multi-link device (Non-AP MLD 2) includes a second station (STA 2). A first link (Link 1) is configured between the first station (STA 1) and the first AP (AP 1). The first link (Link 1) is configured between the second station (STA 2) and the first AP (AP 1). The mapping between a link and a TID in the first link (Link 1) is configured. AC_VI and AC_VO are mapped to the link from the first station (STA 1) to the first AP (AP 1). In addition, all TIDs are mapped to the link from the first AP (AP 1) to the first station (STA 1). The mapping between a link and a TID in a second link (Link 2) is configured. AC_VO is mapped to the link from the second station (STA 2) to the first AP (AP 1). In addition, all TIDs are mapped to the link from the second AP (AP 2) to the first station (STA 1). In FIG. 20B, in the case that a first AP (AP 1) transmits a trigger frame to a first station (STA 1) and a second station (STA 2), the first AP (AP 1) may perform channel access based on AC_VI and AC_VO. This is because AC_VI and AC_VO are mapped to the link from the first station (STA 1) to the first AP (AP 1), and AC_VO is mapped to the link from the second station (STA 2) to the first AP (AP 1). In the case that the first AP (AP 1) transmits a trigger frame to the first station (STA 1) and a third station (STA 3) that does not belong to any multi-link device, the first AP (AP 1) may perform channel access using any AC. In the case that the first AP (AP 1) transmits a trigger frame that triggers random access, the first AP (AP 1) may perform channel access using any AC.

According to another detailed embodiment, in the case that a station performs channel access to transmit a frame that triggers UL MU transmission, the station may perform channel access irrespective of the mapping between a link and a TID. In this instance, the station may use any AC. In this instance, the mapping between a link and a TID may be a mapping between a UL link and a TID. In addition, the mapping between a link and a TID may be a mapping between a TID and a link in a direction in which a trigger frame is transmitted.

As described above, in the case that the station transmits a TB PPDU, the station may transmit a frame corresponding to a TID that is not mapped to a link in the corresponding link. In the case that the station does not obtain a TXOP via a contention procedure, the station may perform transmission irrespective of the mapping between a link and a TID. In the case that the station obtains a TXOP via a contention procedure, the station may perform transmission based on the mapping between a link and a TID. For example, in the case that the station does not obtain a TXOP via a contention procedure, the station may transmit a frame corresponding to a TID that is not mapped to a link in the corresponding link. In the case that the station obtains a TXOP via a contention procedure, the station may transmit only a frame corresponding to a TID that is mapped to a link in the corresponding link.

FIG. 21 is a diagram illustrating an operation of performing transmission in a plurality of links, by a multi-link device according to an embodiment of the disclosure.

As in the embodiments described with reference to FIGS. 10 to 15, restriction on the transmission end time of multi-link transmission may be applied.

In a detailed embodiment, a multi-link device may determine, based on the frequency interval between links, whether to apply restriction on a transmission end time. Depending on the frequency interval, the degree of occurrence of an internal leakage may differ. In the case that the frequency interval between links falls within a predetermined frequency interval, the multi-link device may be restricted to perform simultaneous transmission and reception in a plurality of links. In addition, in the case that the frequency interval between links is greater than a predetermined frequency interval, the multi-link device may not be restricted to perform simultaneous transmission in a plurality of links or simultaneous reception in the plurality of links.

In addition, restriction may be applied on a bandwidth used by a multi-link device that restrictively performs STR, or a multi-link device that communicates with the multi-link device that restrictively performs STR. In addition, under a predetermined situation, a multi-link device that restrictively performs STR, or a multi-link device that communicates with the multi-link device that restrictively performs STR may use a bandwidth that is narrower than a predetermined width.

In FIG. 21, a non-AP multi-link device may include a first station (STA1) and a second station (STA2). The first station (STA 1) and the second station (STA 2) may operate in a first link (Link 1) and a second link (Link 2), respectively. A non-AP multi-link device may restrictively support STR. Specifically, STR by the non-AP multi-link device may be restricted based on the bandwidth or the channel location of a link. In FIG. 21, in the case that the non-AP multi-link device operates in channel P20 of the first link (Link 1) and the channel of the second link, the non-AP multi-link device may perform STR. In addition, in the case that the non-AP multi-link device operates in channel S20 or channel S40 of the first link (Link 1) and the channel of the second link, the non-AP multi-link device is incapable of performing STR.

As described above, a station that performs transmission associated with a non-AP multi-link may transmit a PPDU using a limited bandwidth. Specifically, as described above, the station that performs transmission associated with a non-AP multi-link may transmit a PPDU using a limited bandwidth when the non-AP multi-link device performs transmission. In the embodiment of FIG. 21, in the case that the second station (STA 2) is performing transmission, the first AP (AP 1) may perform transmission to the second station (STA 2) using a channel excluding channel S20 or channel S40 which is a channel that the first station (STA 1) is restricted to use in the first link (Link 1).

The multi-link device may autonomously make a decision associated with the use of the above-described restricted channel. In another detailed embodiment, the use of a restricted channel may be specifically indicated. For example, a frame that triggers UL MU transmission may allocate a restricted channel. In addition, the multi-link device may perform signaling whether STR is available for each channel when a corresponding channel is used. For example, the multi-link device may perform signaling whether STR is available for each channel when each of channel P20, channel P40, and channel P80 is used.

Figure 22:
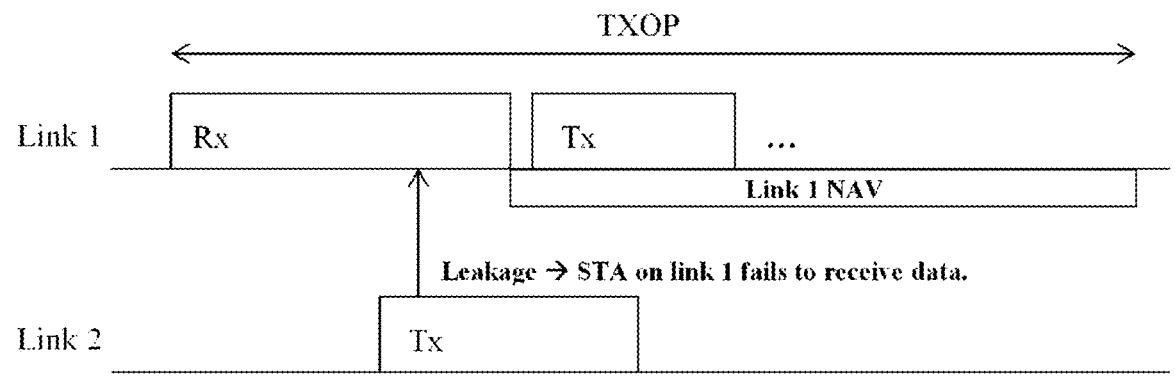
FIG. 22 is a diagram illustrating an operation of setting a NAV by a multi-link device according to an embodiment of the disclosure.

FIG. 22 is a diagram illustrating an operation of setting a NAV by a multi-link device according to an embodiment of the disclosure.

As described above, transmission may fail due to an internal leakage caused when transmission and reception are simultaneously performed in a plurality of adjacent links. In FIG. 22, the multi-link device also performs transmission in a second link while performing reception via a first link. Due to the transmission in the second link, the multi-link device may fail in reception in the first link. In the case that a station that operates in the second link determines that the channel of the second link is idle, the corresponding station may access the channel and may perform transmission. The stations that operate in the first link (Link 1) may set a network allocation vector (NAV) based on a PPDU or a frame transmitted in the first link (Link 1). The stations that operate in the first link (Link 1) may determine that a channel is busy due to a NAV while another station performs transmission in the first link (link 1). As described above, in the case that a frame or a PPDU transmitted in the first link is capable of setting a NAV in the second link, the probability of failing in transmission due to an internal leakage may be reduced. This will be described with reference to FIGS. 23 to 26.

Figure 23:
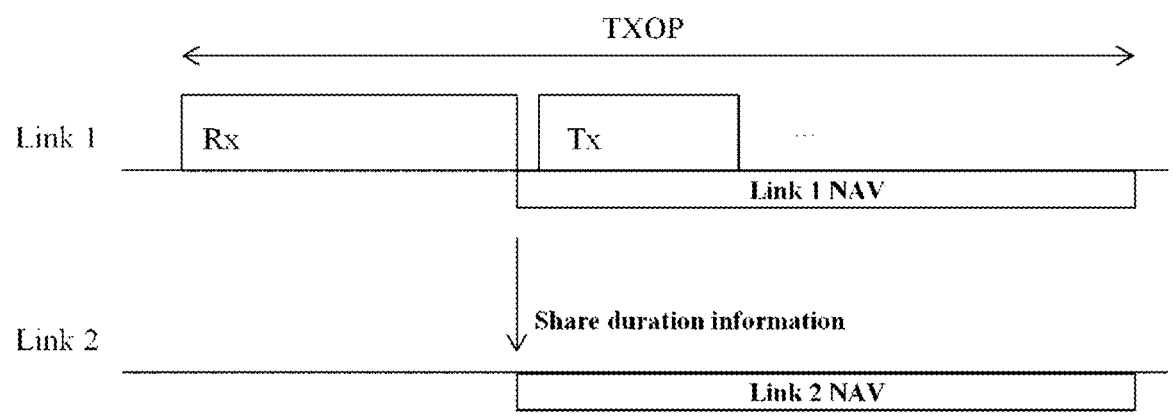
FIG. 23 is a diagram illustrating an operation of setting a NAV by a multi-link device according to an embodiment of the disclosure.

FIG. 23 is a diagram illustrating an operation of setting a NAV by a multi-link device according to an embodiment of the disclosure.

The multi-link device may share duration information between links. In this instance, the duration information may be a TXOP Duration field of a signaling field of a PPDU. In this instance, the signaling field may be an HE-SIG-A field. In addition, the signaling field may be a U-SIG field. In addition, the duration information may be a value indicated by a Duration/ID field of a MAC header. The TXOP Duration field and the Duration/ID field may indicate a TXOP. In another detailed embodiment, the duration information may be a value indicated by a Length field of an L-SIG field of a PPDU. The Length field may indicate the length from the end of the L-SIG field to the end of the PPDU in the PPDU including the L-SIG

FIELD

Based on shared duration information, the multi-link device may restrict channel access or transmission in each link. Specifically, based on the shared duration information, the multi-link device may set the NAV of a station of each link. For example, based on a frame or a PPDU transmitted to another station included in the multi-link device, the station included in the multi-link device may set a NAV. In this instance, in the case that the multi-link device performs channel access or transmission, the multi-link device may reset a NAV. In this instance, the NAV may be an intra-BSS NAV. The intra-BSS NAV may be a NAV set by an intra-BSS frame or an intra-BSS PPDU.

In FIG. 23, the multi-link device may perform reception in the first link. The duration information received in the first link may be transferred to a second link, and a station that operates in the second link may set a NAV based on the transferred duration information. As described above, a NAV is also set for the station that operates in the second link and thus, the station that operates in the second link does not perform channel access or transmission while transmission is performed in the first link.

In another detailed embodiment, a plurality of stations included in the multi-link device may use an inter-link NAV. Specifically, a station included in the multi-link device may perform channel access based on an inter-link NAV that is a NAV set based on a PPDU or a frame that another station included in the same multi-link device exchanges. For example, in the case that the multi-link device operates in the first link and the second link, a station that operates in the second link among the stations of the multi-link device may set an inter-link NAV based on a PPDU or frame transmitted in the first link. In this instance, the corresponding station may not perform transmission in the second link based on the value of the set inter-link NAV. Specifically, based on the value of the set inter-link NAV, the corresponding station may determine that a channel in the second link is busy. In addition, the multi-link device that does not support STR may access a channel based on the inter-link NAV. In this instance, the multi-link device that sets the inter-link NAV may determine, based on the inter-link NAV, whether to perform channel access or transmission in a plurality of links or in all links in which the multi-link device operates.

In addition, the station may access a channel based on a basic NAV as well as the intra-BSS NAV. The basic NAV may be a NAV set by an inter-BSS frame or an inter-BSS PPDU. In addition, in the case that the station is incapable of determining whether a received frame is an inter-BSS frame or an intra-BSS frame, or in the case that the station is incapable of determining whether a received PPDU is an inter-BSS PPDU or an intra-BSS PPDU, the station may set a basic NAV based on the received frame or PPDU.

In the case that an inter-link NAV is set as described above, although a NAV set in association with transmission in another link is reset, the NAV value set in association with transmission in a link may be maintained as it is. For example, in the case that the multi-link device operates in the first link and the second link, a station that operates in the second link among the stations of the multi-link device may set a NAV based on a PPDU or frame transmitted in the second link.

Subsequently, in the case that after the corresponding station sets a NAV based on the PPDU or frame transmitted in the first link, a TXOP expires in the first link and the NAV is reset, the NAV set for transmission in the second link may also be reset. In the case that an inter-link NAV operates, although a TXOP expires in the first link and the inter-link NAV is reset, the multi-link device may maintain a NAV set for the transmission in the second link. Therefore, the multi-link device may reliably operate using the inter-link NAV.

In the above-described embodiments, an operation in which a station sets a NAV may be replaced with an operation in which a station suspends channel access or transmission in a physical layer. Alternatively, in the above-described embodiments, an operation in which a station sets a NAV may be replaced with an operation in which a station determines that a channel is busy. In this instance, an operation in which a station resets a NAV may be replaced with an operation in which a station performs channel access, performs transmission, or determines that a channel is idle. To this end, a primitive that is exchanged between a physical layer and a MAC layer may be used. Specifically, a primitive that connects the MAC layer of a single station of the multi-link device and the physical layer of another station of the corresponding multi-link device may be used. Alternatively, the MAC layer of a single station of the multi-link device and the MAC layer of another station of the corresponding multi-link device may be connected.

In addition, in the case that a single station of the multi-link device starts receiving a PPDU, another station of the multi-link device may suspend performing channel access. As described above, another station may suspend performing channel access based on duration information. However, due to the location of a field including the duration information, the suspension of performing channel access may be delayed. Therefore, since channel access is performed until the duration information is obtained, when transmission is performed, an internal leakage may occur. Accordingly, as described above, in the case that a single station of the multi-link device starts receiving a PPDU, another station of the multi-link device may suspend performing channel access. In addition, in the case that an intended receiver of a PPDU received by any one station or a frame included in the PPDU is not the corresponding station, another station may resume suspended channel access. This will be described in detail with reference to FIG. 24.

Figure 24:
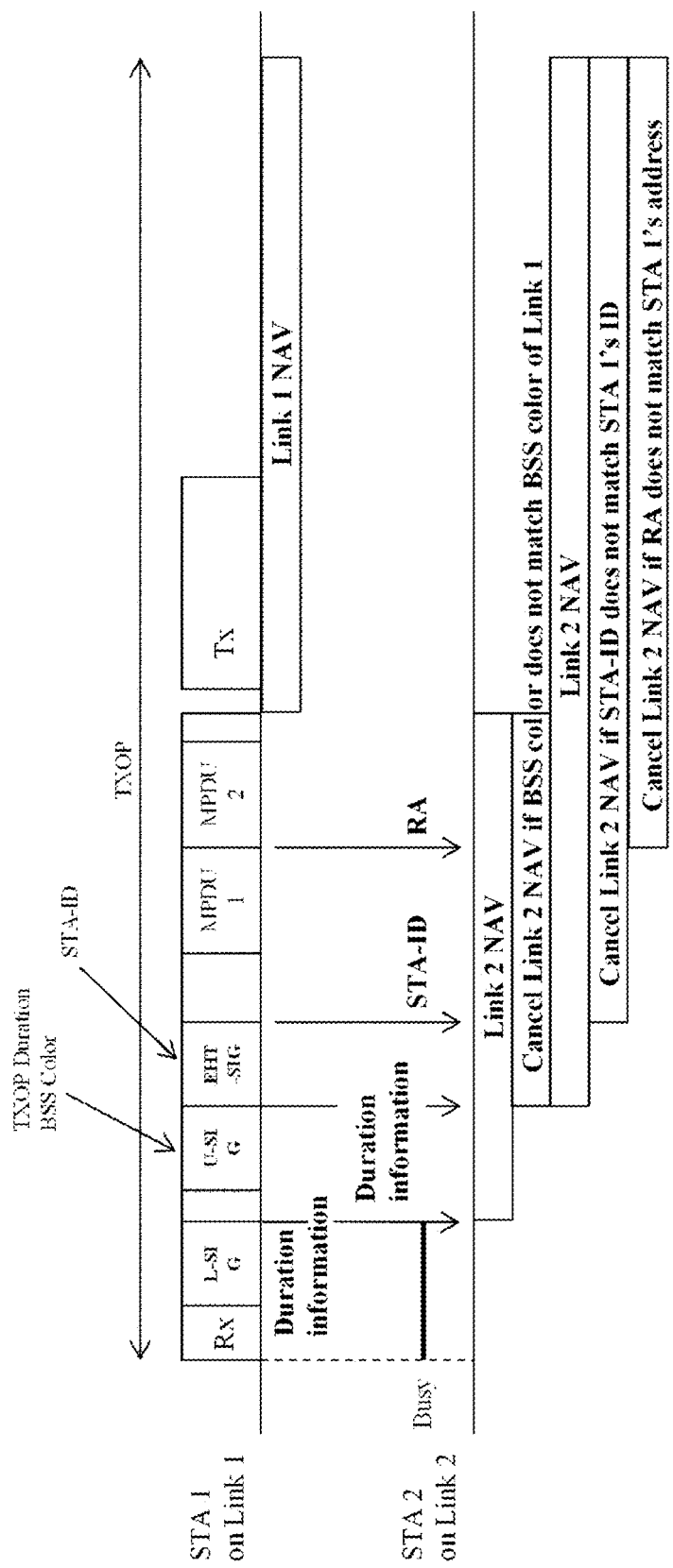
FIG. 24 is a diagram illustrating that a station of a multi-link device suspends performing channel access or transmission due to a PPDU received by another station of the multi-link device, and resumes performing channel access or transmission according to an embodiment of the disclosure.

FIG. 24 is a diagram illustrating that a station of a multi-link device suspends performing channel access or transmission due to a PPDU received by another station of the multi-link device, and resumes performing channel access or transmission according to an embodiment of the disclosure.

As described above, a station of a multi-link device may suspend channel access or transmission due to a PPDU received by another station of the multi-link device. In this instance, in the case that a receiver of the PPDU that the another station receives or a frame included in the PPDU is different from the another station, the station may resume channel access or transmission. Specifically, in the case that the another station fails to perform PPDU decoding, the station may resume the channel access or transmission. In a detailed embodiment, in the case that the another station obtains duration information from an L-SIG field of the PPDU, the station may continuously suspend channel access or transmission. In the case that the station does not obtain duration information from the L-SIG field of the PPDU, the station may resume channel access or transmission. For example, in the case that the station fails to decode the L-SIG field of the PPDU, the station may resume channel access or transmission. In addition, in the case that the another station fails to decode a U-SIG field or an HE-SIG-A field of the PPDU, the station may resume channel access or transmission. In a detailed embodiment, in the case that the another station obtains duration information from the U-SIG field or the HE-SIG-A field of the PPDU, the station may continuously suspend channel access or transmission. In addition, in the case that a PHY identifier of the PPDU that the another station receives is in a PPDU format that the another station does not support, the station may resume channel access or transmission.

In addition, in the case that a BSS color of the PPDU that the another station receives does not indicate a BSS which the another station belongs to, the station may resume channel access or transmission. In the case that a BSS color of the PPDU that the another station receives indicates a BSS which the another station belongs to, the station may continuously suspend channel access or transmission. In the case that the station fails to obtain a BSS color from the U-SIG field or the HE-SIG-A field of the PPDU, the station may resume channel access or transmission.

In addition, in the case that an intended receiver of the PPDU that the another station receives is not the another station, the station may resume channel access or transmission. In the case that an intended receiver of the PPDU that the another station receives is the another station, the station may continuously suspend channel access or transmission. In the case that the another station is an intended receiver of the received PPDU, at least one STA-ID included in EHT-SIG or HE-SIG-B of the PPDU may indicate the another station. Specifically, in the case that the another station is an intended receiver of the received PPDU, one of the STA-IDs included in EHT-SIG or HE-SIG-B of the PPDU may indicate a group including the another station. For example, in the case that one of the STA-IDs indicates broadcast, the station may determine that the another station is an intended receiver of the received PPDU.

In addition, in the case that an intended receiver of the PPDU that the another station receives is not the another station, the station may resume channel access or transmission. In this instance, a station indicated by an RA field or a DA field of the MAC header is the another station, the station may determine that an intended receiver of a frame included in the PPDU that the another station receives is the another station. In the case that the RA field or the DA field of the MAC header indicates a group including the another station, the station may determine that an intended receiver of a frame included in the PPDU that the another station receives is the another station. In the case that the RA field or the DA field of the MAC header indicates broadcast, the station may determine that an intended receiver of a frame included in the PPDU that the another station receives is the another station.

In the case that an intended receiver of a frame included in the PPDU that the another station receives is the another station, the station may continuously suspend channel access or transmission.

In the above-described embodiments, in the case the station continuously suspends channel access or transmission, the station may suspend channel access or transmission until the end of the PPDU that the another station receives. In this embodiment, the station may quickly resume transmission. In another detailed embodiment, in the case that the station continuously suspends channel access or transmission, the station may suspend channel access or transmission until a TXOP duration. In this embodiment, the station more reliably protects the sequence of frame exchange performed in another link. In this instance, the TXOP duration may be obtained from a Duration/ID field of the MAC header or a signaling field of the PPDU.

The above-described suspension/resumption of channel access or transmission may be applied when another station receives a PPDU and sequentially decodes the signaling field of the received PPDU. In this instance, the decoding sequence may be determined based on a PPDU format and a frame format. For example, in the case that the received PPDU is an EHT PPDU as illustrated in FIG. 24, the another station may sequentially decode L-SIG, U-SIG, EHT-SIG, and a MAC header. In addition, in the case that the received PPDU is HE SU PPDU or HE TB PPDU, the another station may sequentially decode L-SIG, HE-SIG-A, and a MAC header. In addition, in the case that the received PPDU is HE MU PPDU, the another station may sequentially decode L-SIG, HE-SIG-A, HE-SIG-B, and a MAC header. In addition, in the case that the received PPDU is 11 a/g PPDU, the another station may sequentially decode L-SIG and a MAC header.

The above-described intended receiver of a PPDU or a frame may be an intended receiver of an RU in which the PPDU is transmitted. In addition, an identifier used for determining whether a receiver is an intended receiver may be a value determined based on the AID or MAC address of the station. In addition, an identifier used for determining whether a receiver is an intended receiver may be an identifier indicating a single station.

Figure 25:
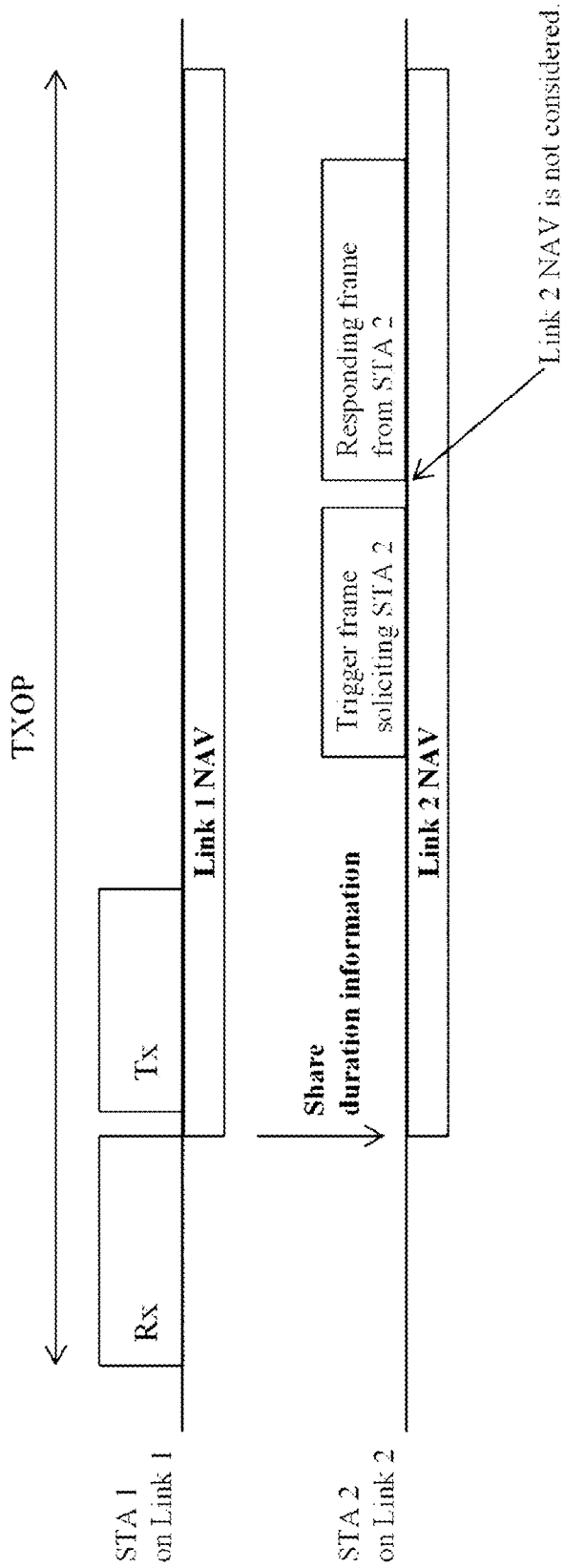
FIG. 25 is a diagram illustrating a method of transmitting, by a multi-link device, a response to a trigger frame in the case that a NAV is set for the multi-link device according to an embodiment of the disclosure and a trigger frame is received.

FIG. 25 is a diagram illustrating a method of transmitting, by a multi-link device, a response to a trigger frame in the case that a NAV is configured for the multi-link device according to an embodiment of the disclosure and a trigger frame is received.

In the case that a station transmits a response to a frame that triggers UL MU transmission, the station may not take into consideration an intra-BSS NAV and the above-described inter-link NAV. Specifically, in the case that a station transmits a response to a frame that triggers UL MU transmission and is transmitted from a BSS which the station belongs to, the station may not take into consideration an intra-BSS NAV and the above-described inter-link NAV. In the case that a station transmits a response to a frame that triggers UL MU transmission and is transmitted from a multi-link device including a station of a BSS which the station belongs to, the station may not take into consideration an intra-BSS NAV and the above-described inter-link NAV. In this instance, the station may be an AP.

In the case that a station receives a trigger frame from a multi-link device including a station that transmits a frame that sets the currently set intra-BSS NAV or inter-link NAV, and the station transmits a response to the trigger frame, the station may not take into consideration an intra-BSS NAV and inter-link NAV. In addition, in the case that a station receives a trigger frame from a station that transmits a frame that sets the currently set intra-BSS NAV or inter-link NAV, and the station transmits a response to the trigger frame, the station may not take into consideration an intra-BSS NAV and inter-link NAV.

In the above-described embodiments, the fact that a station does not take into consideration a NAV means that the station disregards a NAV although the NAV is set, determines that virtual carrier sensing is idle, or determines that virtual carrier sensing is not performed.

In these embodiments, although an AP multi-link device sets a NAV for a non-AP multi-link device, the AP multi-link device may trigger transmission by non-AP multi-link device. Therefore, the AP multi-link device may increase the efficiency of a network.

In the embodiment of FIG. 25, a non-AP multi-link device may include a first station (STA1) and a second station (STA2). The first station (STA 1) and the second station (STA 2) may operate in a first link (Link 1) and a second link (Link 2), respectively. The second station (STA 2) sets a NAV based on a frame or a PPDU transmitted to the first station (STA1). In this instance, in the case that the second station (STA2) receives a trigger frame that triggers the second station (STA2) from an AP associated with the second station (STA2) or an AP included in a multi-link device that includes an AP associated with the second station (STA2), the second station (STA2) may transmit a response to the trigger frame without taking into consideration the NAV set for the second station (STA2).

Although the disclosure has been described using WLAN communication as an example as described above, the disclosure is not limited thereto and may be equally applied to other communication systems such as cellular communication. In addition, although the methods, devices, and systems of the disclosure have been described in connection with certain embodiments, some or all of the components, operations of the disclosure may be implemented using a computer system having a general-purpose hardware architecture.

The features, structures, effects, etc. described in the above embodiments are included in at least one embodiment of the disclosure and are not necessarily limited to one embodiment. Further, the features, structures, effects, etc. illustrated in each embodiment may be combined or modified for other embodiments by one of ordinary skill in the art to which the embodiments belong. Accordingly, the contents relating to these combinations and modifications should be construed as falling within the scope of the disclosure.

Although described above with a focus on the embodiment, this is only an example and is not limited to the disclosure, and those of ordinary skill in the art to which the present invention pertains will appreciate that various modifications and applications not exemplified above are possible without departing from the essential characteristics of the present embodiment. For example, each component specifically illustrated in the embodiment is one that may be modified and implemented. In addition, the differences relating to these modifications and applications should be construed as falling within the scope of the disclosure as defined in the appended claims.

The invention claimed is:

1. A multi-link device that uses a plurality of links, the multi-link device comprising:
a transceiver; and
a processor,
wherein, when the multi-link device simultaneously transmits a plurality of PPDUs in the plurality of links using the transceiver, the processor is configured:
to determine, based on whether the multi-link device transmits a frame that requests an immediate response, a transmission end time of the plurality of PPDUs,
to align ends of a plurality of PPDUs that request immediate responses among the plurality of PPDUs, and
not to align an end of a PPDU including only a first frame that does not request an immediate response among the plurality of PPDUs with an end of a PPDU including a second frame that requests an immediate response among the plurality of PPDUs.

2. The multi-link device of claim 1, wherein, when the multi-link device simultaneously transmits the plurality of PPDUs in the plurality of links, the processor is configured to transmit the plurality of PPDUs in a manner in which the end of the PPDU including only the first frame that does not request the immediate response among the plurality of PPDUs is not later than the end of the PPDU including the second frame that requests an the immediate response among the plurality of PPDUs.

3. The multi-link device of claim 1, wherein, whether the second frame that requests the immediate response is a frame that requests an ACK based on an ACK policy.

4. The multi-link device of claim 3, wherein the second frame that requests the ACK is a data frame.

5. The multi-link device of claim 1, wherein the multi-link device is an AP multi-link device, and
wherein the processor is configured to transmit the plurality of PPDUs to a non-AP multi-link device using the transceiver.

6. The multi-link device of claim 1, wherein, in a case that the multi-link device that receives the plurality of PPDUs performs transmission in any one link, the multi-link device is incapable of performing reception in another link.

7. A multi-link device that uses a plurality of links, the multi-link device comprising:
a transceiver; and
a processor,
wherein the processor is configured to:
simultaneously receive a plurality of PPDUs from the plurality of links using the transceiver,
based on whether a frame that requests an immediate response is transmitted in the plurality of PPDUs, a transmission end time of the plurality of PPDUs is determined,
wherein ends of a plurality of PPDUs that request immediate responses among the plurality of PPDUs are aligned, and
wherein an end of a PPDU including only a first frame that does not request an immediate response among the plurality of PPDUs is not aligned with an end of a PPDU including a second frame that requests an immediate response among the plurality of PPDUs.

8. The multi-link device of claim 7, wherein the end of the PPDU including only the first frame that does not request the immediate response among the plurality of PPDUs is not later than the end of the PPDU including the second frame that requests the immediate response among the plurality of PPDUs.

9. The multi-link device of claim 7, wherein whether the second frame that requests the immediate response is a frame that requests an ACK is determined based on an ACK policy.

10. The multi-link device of claim 9, wherein the second frame that requests the ACK is a data frame.

11. The multi-link device of claim 7, wherein the multi-link device is a non-AP multi-link device, and
wherein the processor is configured to receive the plurality of PPDUs from an AP multi-link device using the transceiver.

12. The multi-link device of claim 7, wherein the processor is configured to: access a channel using a channel access method that uses a backoff counter in the plurality of links, wherein an initial value of the backoff counter is set by an obtained random number, the backoff counter is decreased by one when a channel accessed during a slot time is idle, and when a value of the backoff counter is 0, a station is allowed to access a channel; and
even when the backoff counter reaches 0 in a channel access of any one of the plurality of links, not perform transmission in the any one link.

13. The multi-link device of claim 12, wherein, when not performing transmission in the any one link, the processor is configured to maintain the value of the backoff counter.

14. A method of operating a multi-link device that uses a plurality of links, the method comprising:
simultaneously receiving, by the multi-link device, a plurality of PPDUs from the plurality of links using a transceiver; and
based on whether a frame that requests an immediate response is transmitted in the plurality of PPDUs, determining a transmission end time of the plurality of PPDUs,
wherein ends of a plurality of PPDUs that request immediate responses among the plurality of PPDUs are aligned, and
wherein an end of a PPDU including only a first frame that does not request an immediate response among the plurality of PPDUs is not aligned with an end of a PPDU including a second frame that requests an immediate response among the plurality of PPDUS.

* * * * *